US009148074B2

(12) United States Patent
Boughtwood

(10) Patent No.: US 9,148,074 B2
(45) Date of Patent: Sep. 29, 2015

(54) APPARATUS FOR USE AS A MOTOR OR GENERATOR

(75) Inventor: Martin Boughtwood, Pontypridd (GB)

(73) Assignee: Deregallera Holdings Ltd., Pontypridd (GB)

( * ) Notice: Subject to any disclaimer, the term of this patent is extended or adjusted under 35 U.S.C. 154(b) by 347 days.

(21) Appl. No.: 13/641,494

(22) PCT Filed: Apr. 15, 2011

(86) PCT No.: PCT/GB2011/050753
§ 371 (c)(1),
(2), (4) Date: Dec. 18, 2012

(87) PCT Pub. No.: WO2011/128700
PCT Pub. Date: Oct. 20, 2011

(65) Prior Publication Data
US 2013/0088117 A1     Apr. 11, 2013

(30) Foreign Application Priority Data

Apr. 16, 2010 (GB) .................................... 1006400.4
Mar. 8, 2011 (GB) .................................... 1103913.8

(51) Int. Cl.
*H02N 11/00* (2006.01)
*H02N 1/00* (2006.01)
*H02N 1/08* (2006.01)

(52) U.S. Cl.
CPC ............... *H02N 1/006* (2013.01); *H02N 1/004* (2013.01); *H02N 1/08* (2013.01)

(58) Field of Classification Search
CPC .......... H02N 1/006; H02N 1/08; H02N 1/004
USPC ........................................................ 310/300
See application file for complete search history.

(56) References Cited

U.S. PATENT DOCUMENTS

| 3,284,693 | A  | 11/1966 | Lim |
| 3,696,258 | A  | 10/1972 | Anderson et al. |
| 4,814,567 | A  | 3/1989  | De Angelis et al. |
| 6,342,671 | B1 | 1/2002  | Morikawa et al. |

(Continued)

FOREIGN PATENT DOCUMENTS

| GB | 1 351 776 | 5/1974 |
| JP | 3-159584  | 7/1991 |

(Continued)

OTHER PUBLICATIONS

International Search Report and Written Opinion from related International Application No. PCT/GB2011/050753 mailed Dec. 2, 2011.

(Continued)

*Primary Examiner* — Hanh Nguyen
(74) *Attorney, Agent, or Firm* — Lempia Summerfield Katz LLC

(57) ABSTRACT

Apparatus (10) for use as a motor or generator, comprising: a capacitor assembly (20) comprising: a first conductor part (36) defining a first conductor region (38) and a second conductor part (37) defining a second conductor region (39), the first and second conductor parts (36, 37) being spaced apart to define opposed sides of a passageway (40) extending between the first and second conductor regions (38, 39); and an inner part (50) moveable relative to at least one of the conductor parts along the passageway (40) extending between the first and second conductor regions (38, 39).

30 Claims, 23 Drawing Sheets

(56) References Cited

U.S. PATENT DOCUMENTS

| | | | |
|---|---|---|---|
| 2002/0163281 A1 | 11/2002 | Rafaelof | |
| 2005/0006980 A1 | 1/2005 | Horst | |
| 2005/0040729 A1 | 2/2005 | Gondoh | |
| 2006/0066934 A1* | 3/2006 | Selbrede | 359/291 |
| 2010/0052597 A1* | 3/2010 | Dong et al. | 318/662 |

FOREIGN PATENT DOCUMENTS

| | | |
|---|---|---|
| JP | 3-169277 | 7/1991 |
| JP | 4-207981 | 7/1992 |
| JP | 4-255474 | 9/1992 |
| JP | 4-285478 | 10/1992 |
| JP | 5-111264 | 4/1993 |
| SU | 1656647 | 6/1991 |
| WO | WO 2006/102444 | 9/2006 |

OTHER PUBLICATIONS

International Preliminary Report on Patentability from related International Application No. PCT/GB2011/050753 mailed Oct. 26, 2012.

UK Search Report in priority application GB 1006400.4, Jun. 22, 2010.

* cited by examiner

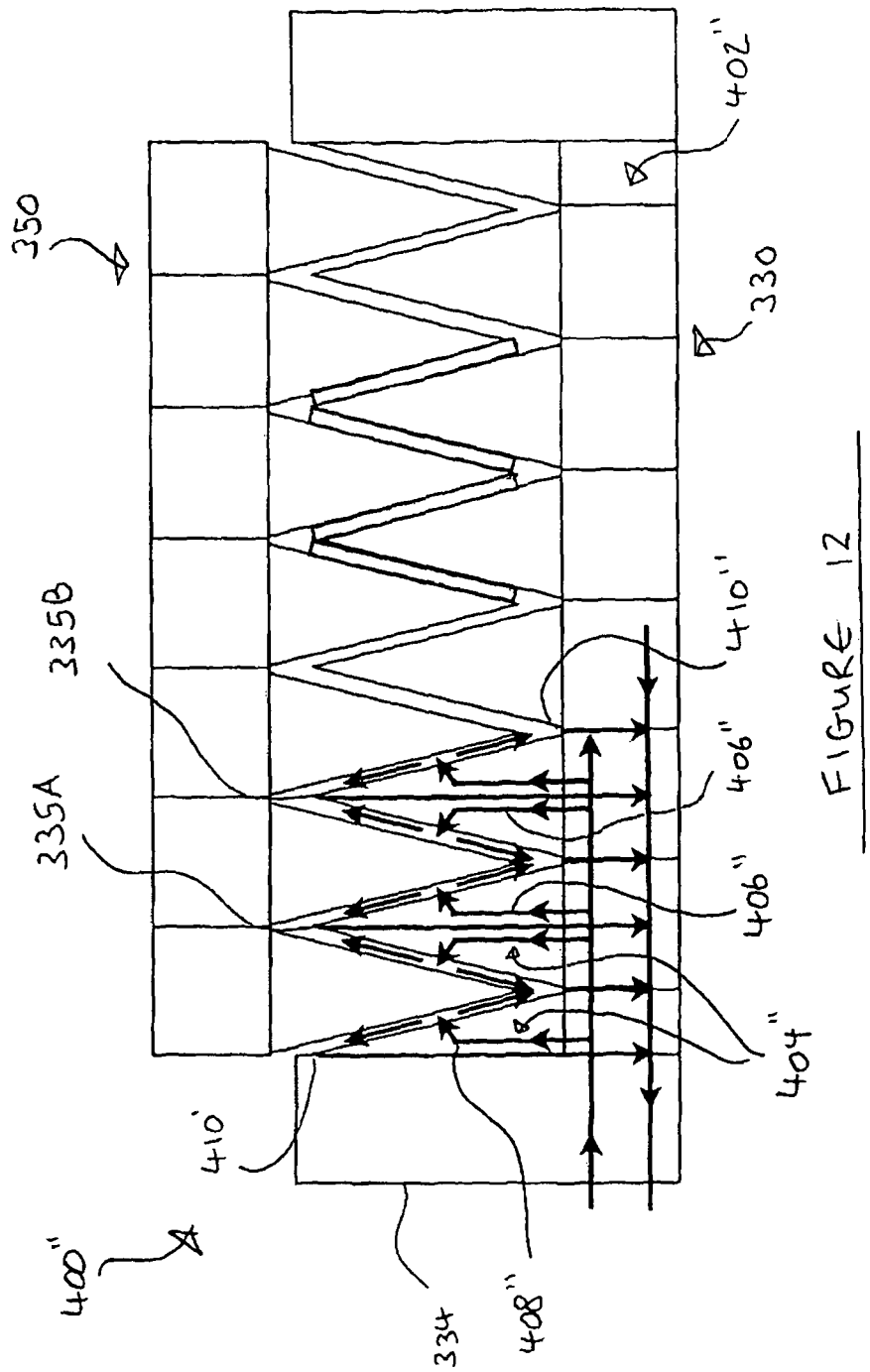

APPARATUS FOR USE AS A MOTOR OR GENERATOR

RELATED APPLICATION DATA

This U.S. national phase application is based on international application no. PCT/GB2011/050753, which was filed on Apr. 15, 2011, which claimed priority to British national patent application no. 1006400.4, which was filed on Apr. 16, 2010, and British national patent application no. 1103913.8, which was filed on Mar. 8, 2011. Priority benefit of these earlier filed applications is hereby claimed.

The present invention relates to electric machines that function as motors and/or generators, or as sensor/detector transducers, in both rotary and linear forms.

The prior art in the field of electric machines that function as motors and/or generators is dominated almost to the exclusion of other technologies by electromagnetic devices. These machines are divided into a number of classes such as induction machines, brushed DC machines, synchronous AC machines, permanent magnet machines, switched reluctance machines, to name some of the more common sub-classes. Without exception these machines depend upon the electromagnetic interaction of two elements, a rotor and a stator, such that a force is developed between the elements and this force is arranged to act in a direction that results in a force being developed between the elements and thus relative motion occurs.

Recently a class of rotary machine has been developed that operates on the piezoelectric principle whereby an electric charge causes bending of an element that then mechanically interacts with a rotatably disposed rotor element and develops a torque. This principle can also be applied to linear motion configurations.

There is another class of machine recently developed that is based on the use of superconducting materials used as the coil material and thus developing little or no loss in the coils.

There have also been machines based on electrostatic principles, these machines generally falling into two subclasses: a class based upon the so called "Amber effect" or friction induced electrostatic charge; and a second class that depends upon an externally generated varying high voltage field between the rotor and stator elements.

When considering the prospect of a completely new machine which is the subject of this invention, it is useful to consider the benefits and weaknesses of the existing designs and technologies. In the following descriptions rotary machines are used as the reference, but the descriptions apply equally to linear machines where thrust force replaces torque and translation replaces rotation. The moveable element of a linear machine is termed the rotor and the static part the stator, however in some configurations of both rotary and linear machines the rotor can be the static part and the stator the movable part. However for the purposes of the following discussion and for consistency with convention the term rotor is used herein to refer to the moving element. Rotary machines can be regarded as simply a circular arrangement of a linear force generator.

Considering the electromagnetic machines which dominate all other classes, there are a number of problems that would be desirable to eliminate.

This class of machine is invariably built using coils of wire on at least one of its elements, typically copper wire, wound in a manner that provides for a suitable force density. The force exerted by such machines is proportional to the number of coil turns, the level of current flowing in the coil and the level of magnetic flux against which the coil generated magnetic field reacts. Torque, in a rotary configured machine, or thrust in a linearly configured machine is then developed due to the geometry of the position of the coils with respect to the rotor element and its reacting magnetic field.

For a given size of machine, force or torque is directly related to the current flowing in the coils and it is the current that is varied to develop a variable amount of force and hence torque. Thus it will be appreciated by those skilled in the art that the machine is limited in its output force/torque by its ability to dissipate/remove heat generated due to inefficiencies. This is of course a general limit applicable to most known machines. However the electromagnetic machine winding losses, that is resistive heating losses, are proportional to the square of the current, whilst force is proportional to the current. Thus as force/torque is increased the losses increase as a square function of the force/torque and soon limit the machine output due to thermal constraints.

Because the magnetic field is also proportional to the coil turns it is possible to have a larger number of coil turns to provide for a lower operating current. However, reducing the current by increasing the coil turns results in the same level of losses in any given physical size of machine. Halving the current requires the coil turns to be doubled to achieve the same force product. Doubling the coil turns in the same available volume of space requires that the coil wire diameter is halved. Thus the coil is now double the length and half the diameter—thus providing for a square law increase in wire resistance which in turn gives the same loss product with the reduced level of current.

It will also be seen that as the losses in an electromagnetic machine are proportional to torque, at a fixed torque level (and hence fixed loss level) the loss increases as a percentage of output power as speed decreases. Thus for machines that spend a large part of their operating time at lower speeds but at higher forces/torques, there is a substantial inefficiency in percentage terms.

Thus for high force/torque machines that need to be small and lightweight the electromagnetic machine has major handicaps. This limitation is handled to some extent by the use of good thermal design to ensure the heat is extracted either quickly to atmosphere or via a cooling system based on some form of heat exchange within the machine (e.g. such as fluid cooling channels or the like). Nevertheless the level of loss may be quite high and sets the limit of performance. There is a further drawback with electromagnetic machines and that is the difficulty in getting a design that provides both a high level of torque and a high top speed. Typically a machine is operated with a power supply having a defined maximum voltage level. Electromagnetic induction dictates a physical relationship between the reverse voltage induced in the coil (the back emf) and the combined effect of the number of turns in a coil, the magnetic flux against which the coil generated field is reacting and the relative velocity of the movable element with respect to the fixed element. So for a defined number of turns and magnetic flux level, there is a limit to the relative velocity that is reached when the back emf approaches or is equal to the supply voltage. At this point the supply voltage is no longer adequate to force current to flow in the system thus force/torque drops to zero. It will therefore be seen that increasing the number of turns to reduce current level in a machine of defined physical size is limited by the required speed of the machine and the available supply voltage. In applications such as electric vehicles there is a need for both a high speed at moderate torque and a high torque at moderate speed. This often requires a relatively low number of turns to enable the attainment of the desired speed within the available supply voltage, with the consequent need for substantially high current to provide the torque at lower speed. This high current then requires large and expensive power electronics, with the attendant need for active and intense heat exchange systems to protect the electronics. Often a trade-off has to be made to strike a balance between the issues with coil winding and electronics current ratings.

Electromagnetic machines further suffer from both saturation issues (related to the magnetic circuit, often but not always comprised of iron or ferrous material) and or eddy current losses in copper windings. In machines that use iron or ferrous materials as the magnetic circuit containment means, there is a non-linear limit to the level of magnetic flux that can be efficiently contained within a given cross sectional area of iron. This loss factor is a complex quantity, but adds to the winding losses and increases the heat extraction issues. Similarly in electromagnetic machines that are "ironless" i.e. that have no magnetic circuit in either one of the rotor or stator, the need for coils to be intimately located within the active magnetic flux air gap results in further losses induced in the windings.

Piezoelectric machines do not suffer from the same loss problems as electromagnetic machines since they develop a force proportional to applied voltage and current is typically very low. This provides for a substantial opportunity to increase torque density. However in this case the translation of a bending force exerted by the piezoelectric elements into a linear force or torque invariably requires a mechanical interface, for example in the form of walking ratchet system. This necessarily results in mechanical wear and limits on speed. As the displacement of the piezoelectric elements is very small, on the nano or micro scale, the interactions at the mechanical interface are substantial and frequent.

The Superconducting machines substantially eliminate heat loss in the machine by virtue of the use of lossless conductors. Thus once a flowing current is established, there are no current squared losses. The challenge with this class of machine is the need to maintain the conductors at a relatively low temperature—today typically around minus 90 degrees Celsius. This requirement consequently results in conductors that are very much larger than would otherwise be the case. It further requires the need for a cryogenic system suitably sized to keep the conductors cool and this system is itself large, expensive and not very efficient.

In the electrostatic "Amber effect" case, there have generally been limitations due to the very low power possible in a given size. This results primarily from the level of electrostatic charge that can be established in discrete zones of suitable insulator materials and to the need for some form of friction inducing contact with the rotor.

In the second electrostatic case, very little work is evidenced since the early 1900s. At that time the concept of the electrostatic machine was established, but generally abandoned due to the difficulty in having a rotating conducting element in close proximity to the static conducting element where the voltage between the elements was of the order of 30,000 V. Air being the insulating medium between the moving and static elements, gives an intrinsic limit to the applied voltage and carries substantial risk of flash breakdown, especially if the air is not maintained completely dry.

Whilst there is prior art that describes a form of electrostatic machine in which one plate of a capacitive system is the stator and another is the rotor with a small air gap therebetween (J. G. Trump—Electrostatic Sources for Electric Power 1947), the problem with all such electrostatic designs is that torque is proportional to applied voltage and inversely proportional to the air gap between the rotor and stator elements. Thus there exists a serious limitation in the prior art, in that air has a particular level of dielectric strength such that for a given air gap the applied voltage can be no greater than this breakdown voltage. Attempts to avoid the dangers associated with contaminated or moist air have been made by the use of evacuated machines. This however adds further complexity and is still subject to the risks associated with close proximity of the conductive elements. Secondly the rotor has to be made very robust to prevent the prospect of the rotor elements deforming under load and due to the small air gap, risking a short circuit between the rotor and stator. Thirdly any deformation of the rotor such that it is displaced slightly closer to one side or the other, results in the force moving the rotor in that direction, to increase proportionally to the inverse square of the distance. Thus the closer the two elements get the harder they try to get closer. Considering the small starting and supply isolating air gap, this makes the machines highly at risk of a short circuit. This is particularly significant when the typical applied voltage is likely to be of the order of 30,000 V or higher.

Thus today there remains the need for a very efficient class of machine which has a loss characteristic that is not dependent upon a square law function of torque and which needs no more volume than a copper wire coil machine, preferably less and with no need of any support system for cooling or vacuum generation.

In accordance with a first aspect of the present invention there is provided apparatus for use as a motor or generator, comprising: a capacitor assembly comprising: a first conductor part (or first outer part) defining a first conductor region and a second conductor part (or second outer part) defining a second conductor region, the first and second conductor parts being spaced apart to define opposed sides of a passageway (e.g. notional passageway) extending between the first and second conductor regions; and an (electrically influenceable) inner part moveable relative to at least one of the conductor parts along the passageway extending between the first and second conductor regions.

In this way, transducer apparatus for use as motor or generator may be provided in which an electric field (e.g. electrostatic field) generated between the first and second conductor regions (e.g. conductor plates) imparts a force on the (electrically non-homogenous) inner part (e.g. inner part with non-homogenous permittivity) acting along the passageway (e.g. substantially perpendicular to the generated electric field). For example, the electric field generated between the first and second conductor regions may generate or interact with regions of differing polarisation in the inner part between the first and second conductor regions. Advantageously, the present invention provides for a simpler and much lighter weight solution to developing high torque than known prior art devices with the potential for very low electrical losses substantially proportional to output power. It falls in the second class of electrostatic machine previously discussed, although potentially without the limitations of earlier designs. The apparatus may be used in any application in which energy is converted between electrical energy and kinetic energy and vice versa including use as a motor, generator or sensor/detector transducer.

The apparatus may be configured to convert between electrical energy and rotary motion (hereinafter "rotary machine") such as a rotary motor or rotary input generator. However, in another embodiment the apparatus may be configured to convert between electrical energy and linear motion (hereinafter "linear machine") such as a linear motor or linear input generator. In the case of a rotary machine, the moveable part of the apparatus (e.g. rotor) may have a substantially annular profile.

The inner part may be the moveable part of the apparatus (e.g. forming part of a rotor). At least one of the first and second conductor parts may be stationary parts of the apparatus (e.g. forming parts of a stator(s)).

In one embodiment, the inner part is a polarisable (e.g. a polarisable dielectric part or a conductive part) or a polarised part (e.g. an electret part). In this way, a relatively high polarisation region of the inner part is attracted (or repelled) by the electric field generated between the first and second conductor regions whereby the field generated attempts to bring the inner part into alignment or further alignment with the electric field.

In one embodiment, the inner part may comprise an electrical insulator (e.g. polarisable dielectric).

The inner part may be configured to follow a path through the passageway. In one embodiment, the inner part comprises first and second regions (e.g. adjacent regions) spaced along the path, the first and second regions being configured to provide different levels of (e.g. electrical) attraction (or different levels of (e.g. electrical) repulsion) to an electric field generated between the first and second conductor parts. In one embodiment, the first region has an electric polarisation potential or electric polarisation level greater than (or of substantially opposite polarity to) that of the second region. In one embodiment, the second region comprises a frame and the first region is received by the frame. In one embodiment, the frame is moulded around the first region (e.g. using injection moulding). In one embodiment the frame is moulded from a glass filled polycarbonate or aramid filled material.

In one embodiment, one of the first and second regions is a dielectric region. For example, in one embodiment the first region is a first dielectric region and the second region is a second dielectric region, the first dielectric region having a relative permittivity (e.g. static relative permittivity) greater than that of the second dielectric region. The first dielectric region may have a high relative permittivity. The second dielectric region may have a low relative permittivity. For example, the first dielectric region may have a relative permittivity over 100 times that of the second dielectric region. In one embodiment, the first dielectric region may have a relative permittivity over 100 times that of the second dielectric region or even over 1000 times that of the second dielectric region. The larger the ratio of the first dielectric region to the second dielectric region, the smaller the applied voltage required to develop a given level of torque. In one embodiment the first dielectric region has a relative permittivity of at least 500. In another embodiment the first dielectric region has a relative permittivity of at least 1000. In one embodiment the second dielectric region has a relative permittivity of less than 10. In another embodiment the second dielectric region has a relative permittivity of less than 5.

In another embodiment, the first region is electrically conductive. In this way, the electric field generated between the first and second conductor regions may be used to polarise the electrically conductive first region in an analogous manner to polarisation of a dielectric first region. The polarised electrically conductive first region then provides a different level of electrical attraction to the (e.g. non-conductive) second region. The electrically conductive region may comprise a metallic alloy.

In use the first region may be polarised in a first orientation relative to the apparatus and the second region may be polarised in a second orientation relative to the apparatus. For example, the first and second orientations may be substantially opposed (e.g. positive and negative respectively). In one embodiment, the first region comprises a permanently polarised material polarised in a first orientation relative to the apparatus and the second region comprises a permanently polarised material polarised in a second orientation relative to the apparatus. For example, the first and second regions may comprise an electret material (e.g. an electrostatic bipolar material).

The inner part may comprise a body (i.e. solid body) and be configured to maintain separation between the first and second conductor parts at all times during use of the apparatus as a motor or generator (e.g. to act as a permanent insulating dielectric barrier between the first and second conductor parts). For example, in a linear machine, the inner part may have a length which exceeds that of the passageway. In the case of a rotary machine, the inner part may be continuous (e.g. have an annular profile). At least one conductor part may have a corresponding annular profile. In one embodiment, the insulator part may be configured to substantially fill the passageway extending between the first and second conductor regions whilst the insulator part moves relative to the first or second conductor part. In the case of a rotary machine, the conductor parts and regions (e.g. first and second interspersed regions) of the inner part may be substantially radially aligned relative to an axis of rotation of the apparatus.

At least one of the first and second conductor parts may comprise an electrically insulating body for supporting the first and second conductor regions respectively. For example, the or each body may comprise a high dielectric strength, low permittivity insulating material. Accordingly, the first and second conductor parts may include both electrically conducting and non-conducting regions.

In one embodiment, the or each electrically insulating body may comprise at least one polarisable region (e.g. polarisable dielectric region). In this way, local static capacitance is provided for storing energy locally in the apparatus thereby reducing the cyclic charge that must be repeatedly transferred back to and through a power supply of the apparatus at each stage of the rotation cycle. Advantageously, the use of such local capacitance permits more efficient use of high voltage conductor regions leading to increased force/torque generation. Furthermore, the impact of interconnection inductance may be substantially reduced or even eliminated, thereby reducing the risk of transient voltage spikes and overvoltage events. In one embodiment, the at least one polarisable region of the electrically insulating body is located between one of the first and second conductor regions and a further conductor region (e.g. between second and third conductor regions as defined below).

The electrically insulating body may further comprises at least one relatively non-polarisable region. In one embodiment, the or each polarisable region of the electrically insulating body comprises a body of polarisable material housed in a chamber or recess defined by the non-polarisable region of the insulating body. In another embodiment, the polarisable region of the electrically insulating body is formed by polarisable particles distributed throughout the non-polarisable region of the electrically insulating body. For example, the electrically insulating body may comprise a polymer (e.g. polycarbonate) with polarisable particles (e.g. ceramic particles such as barium titanate or calcium copper titanate particles) distributed therein. Advantageously, the use of embedded polarisable particles allows simple and low cost manufacturing of the conductor parts (e.g. as a single operation injection moulded item).

In one embodiment, the or each polarisable region of the electrically insulating body is a dielectric region having a relative permittivity (e.g. static relative permittivity) greater than that of the non-polarisable region of the electrically insulating body. The polarisable region of the electrically insulating body may have a high relative permittivity. The non-polarisable region of the electrically insulating body may have a low relative permittivity. For example, the polarisable region of the electrically insulating body may have a relative permittivity over 100 times that of the non-polarisable region of the electrically insulating body. In one embodiment, the polarisable region of the electrically insulating body may have a relative permittivity over 100 times that of the non-polarisable region of the electrically insulating body or even over 1000 times that of the non-polarisable region of the electrically insulating body.

In one embodiment the polarisable region of the electrically insulating body has a relative permittivity of at least 500. In another embodiment the polarisable region of the electrically insulating body has a relative permittivity of at least 1000.

In one embodiment, the polarity of voltage applied across the polarisable region of the electrically insulating body and the polarity of voltage applied across the inner part are opposed. In this way, changes in the axial dimensions of the polarisable parts in the conductor parts and inner part due to piezoelectric response to an applied electric field may be opposite in direction for any given polarity of voltage and approximately similar in magnitude allowing control of spacing between these adjacent parts, even under high electric fields.

In one embodiment, the inner part is moveable relative to each of the first and second conductor parts (e.g. with the conductor parts substantially fixed relative to one another).

In another embodiment, the inner part is moveable relative to only one of the first and second conductor parts. For example, the inner part may comprise an insulator layer attached to one of the first and second conductor parts. The apparatus may comprise a further insulator layer attached to the other conductor part. The insulator layer may be homogenous along the passageway (i.e. with force generation along the passageway occurring due to attraction between the first and second conductor parts) or may be non-homogenous along the passageway (i.e. with force generation along the passageway occurring due to interaction between the generated field and the non-homogenous inner part).

The apparatus may be configured to selectively apply an activation voltage to at least one of the first and second conductor regions.

The inner part may comprise a plurality of first regions and a plurality of second regions (e.g. interspersed between the first regions). In one embodiment, one of the first and second conductor regions comprises a plurality of discrete (e.g. electrically isolated) conductor sub-regions spaced along the passageway and the apparatus is configured to apply an activation voltage to each of the plurality of discrete conductor sub-regions.

In one embodiment, the plurality of discrete conductor sub-regions is divided into two or more interspersed (e.g. uniformly interspersed) groups and the apparatus is configured to apply an activation voltage to each group of the plurality of discrete conductor sub-regions. The apparatus may be configured to apply an activation voltage of substantially the same phase but not necessarily the same polarity to each discrete conductor sub-region in a group. Once the discrete conductor sub-regions in a group are activated by the activation voltage, the electric field generated by each discrete conductor sub-region in that group imparts a force on a nearby one of plurality of first regions of the inner part. In order for smooth force or torque generation to occur, the first regions of the inner part may be equally spaced (e.g. equally circumferentially spaced in the case of a rotor machine) by a distance greater than the spacing between equally spaced conductor sub-regions in a conductor part. In this way, as one of the plurality of first regions of the inner part move into alignment with a conductor sub-region, at least one of the remaining plurality of first regions of the inner part will be staggered from a nearby conductor sub-region. The degree of spacing between the first regions of the inner part may be selected to ensure that as one of the plurality of first regions of the inner part move into alignment of a conductor sub-region, the at least one remaining first region which is staggered from a nearby conductor sub-region partially overlaps with that conductor sub-region to ensure that the electric field generated by the conductor sub-region can impart sufficient force on that first part once activated.

In one embodiment, the apparatus is configured to sequentially apply an activation voltage to each group of the plurality of discrete conductor sub-regions (e.g. with voltage being potentially applied to more than one group of the plurality of discrete conductor sub-regions at the same time but with voltage over a threshold level only being applied to one group of the plurality of discrete conductor sub-regions at any one time). In one embodiment, the activation voltage is a variable voltage. The activation voltage may have an instantaneous level that is a function of electrical angle between the (moveable) inner part and at least one fixed conductor part. In one embodiment, the voltage is applied in a poly-phase substantially sinusoidal manner synchronised to the angular position of each phase group.

The activation voltage may be of sufficient magnitude to ensure that the electric flux density between the activated conductor regions is greater than 50 Coulombs per square meter and preferably greater than 500 Coulombs per square meter.

The other conductor region may comprise a plurality of discrete conductor sub-regions spaced along the path. Each of the plurality of discrete conductor sub-regions may be registered with a respective one of the plurality of discrete conductor sub-regions of the first or second conductor region.

In the case of an inner part comprising a plurality of first regions and a plurality of second regions (e.g. interspersed between the first regions), the plurality of discrete conductor sub-regions may be arranged to generate a field at a plurality of locations along the inner part. In the case of a rotary machine, the plurality of discrete conductor sub-regions and regions (e.g. interspersed first and second regions) of the inner part may be circumferentially spaced (e.g. evenly circumferentially spaced) around an axis of rotation of the apparatus. In this way, the apparatus may be configured to continuously generate torque to provide continuous rotation when operating as a motor or continuously generate electricity when operating as a generator. The plurality of first regions may have a circumferential width substantially similar to a circumferential width of each of the discrete conductor sub-regions.

Each of the conductor sub-regions may be spaced to ensure voltage isolation between circumferentially adjacent sub-sections.

In one embodiment, the other conductor region may comprise a continuous conductor region extending (e.g. continuously across a face of each of the plurality of discrete conductor sub-regions) between each of the plurality of discrete conductor sub-regions in the first or second conductor region. For example, the continuous conductor may form a ground plane of the capacitor assembly. Advantageously, the use of such a continuous conductor may be used to ease connection complexity since only the conductor sub-regions on one conductor part need be individually addressed during operation.

Furthermore, the use of such a continuous conductor may allow a full supply voltage to be more readily applied across each conductor pairing.

In another embodiment, the apparatus comprises a further capacitor assembly including: a third conductor part defining a third conductor region and a fourth conductor part defining a fourth conductor region, the third and fourth conductor parts being spaced apart to define opposed sides of a further passageway extending between the third and fourth conductor regions; and a further inner part moveable relative to at least one of the third and fourth conductor regions along the further passageway extending between the third and fourth conductor regions. The second and third conductor regions may be separable parts or alternatively may be contiguous (e.g. a single component capable of acting as a capacitor plate for both the first-defined and further capacitor assemblies).

The inner part and further inner part may be configured to move in synchrony (e.g. coupled together). The inner part and further inner part may be coupled by a plurality of pins configured to extend through the inner and further inner parts. The pins may be configured to transfer force/torque generated by the apparatus. For example, the pins may be substantially rigid. In the case of a rotary machine, a plurality of circumferentially spaced pins may be used to distribute local stress around the apparatus in order to increase reliability by avoiding cyclic application of torque in a localised part of the apparatus. Each pin may be configured to pass through all inner parts of the apparatus (e.g. to provide torque transmission to the connector pin ends at opposed sides of the apparatus and to locations between each inner part)

The apparatus may be configured to selectively apply an activation voltage to the third and fourth conductor regions. In one embodiment, the apparatus may be configured to apply an activation voltage to the first and second conductor regions at the same time as applying an activation voltage to the third and fourth conductor regions of the further capacitor assembly. Accordingly, the operation of the first-defined capacitor assembly is augmented by the further capacitor assembly.

In another embodiment, the apparatus may be configured to sequentially apply an activation voltage to the first and second conductor regions of the first-defined capacitor assembly and then to the third and fourth conductor regions of the further capacitor assembly (e.g. with a voltage above a threshold level being applied to only one of the first-defined assembly and further capacitor assembly at any one time).

The apparatus may comprise at least one further capacitor assembly as previously defined. Accordingly, in this embodiment the apparatus may comprise n capacitor assemblies in total where n is three or more. The further capacitor assembly including the third and fourth conductor parts may be assigned any physical position in the sequence of n capacitor assemblies (i.e. the third and fourth conductor parts are defined as such since they are the third and fourth conductor parts to be introduced in the claims and not because they are necessarily the third and fourth conductor parts in the physical sequence by which the capacitor assemblies are arranged in the apparatus). For example, in one embodiment, the first and fourth conductor parts form the first and last conductor parts respectively of the apparatus with the at least one further capacitor assembly located therebetween.

In the case of apparatus for converting between electrical energy and rotary motion (i.e. from electrical energy to rotary motion or vice versa) the conductor parts of the capacitor assemblies may each be aligned with an axis of rotation of the inner parts (e.g. so that each angular point on the conductor parts experiences the same axial force) whereby in use forces acting on conductor parts located between the first and fourth conductor parts are minimised.

In one embodiment, the first and fourth conductor parts (e.g. inner and outermost conductor parts) comprise conductor regions associated with only one inner part (i.e. single-sided conductor parts). The first and last conductor parts may be more mechanically robust than conductor parts located between the first and last conductor parts to withstand any axial forces generated by the apparatus. In one embodiment, the first and last conductor parts may further comprise a conductive screen layer (e.g. located on outwardly facing surfaces of the electrically insulating body of the conductor parts) isolated from local ground. In this way, noise currents may be captured and returned to common without risking them passing via ground in order to minimise electromagnetic interference. In one embodiment, the conductive screen layer comprises a conductive film.

The or each inner part may be separated from at least one adjacent conductor part by a fluid (e.g. gas or liquid).

In one embodiment, the fluid is a dielectric fluid having a relative permittivity greater than 1. For example, the fluid may have a relative permittivity greater than that of the second dielectric region. For example, the fluid may have a high relative permittivity. In one embodiment, the fluid has a relative permittivity of at least 10. In another embodiment, the fluid has a relative permittivity of at least 20.

The fluid may have a relative permittivity which is less than 50% of the permittivity of the high permittivity region of the insulator part. In this way, the permittivity of the fluid is not so high as to shunt the electric field generated between the first and second conductor regions from one conductor sub-region to an adjacent sub-region instead of allowing the field to pass through the inner part.

In one embodiment, the apparatus is configured to generate a region of electrical conductivity in the fluid between the first and second conductor regions (e.g. a localised region of electrical conductivity in the fluid between (e.g. substantially only between) an opposed pair of conductor sub-regions). In this way, an effectively frictionless electrical contact between the inner part and conductor parts may be achieved, thereby reducing or even eliminating any loss of electric field intensity due the dielectric constant of the fluid. Advantageously, the provision of such a localised conductive running gap between the or each inner part and an adjacent conductor part may act to reduce the voltage drop across the running gap between opposed pairs of conductor sub-regions thereby providing improved levels of force generation for a predetermined applied voltage.

The apparatus may be configured to generate the localised region of electrical conductivity in the fluid by applying an electric field to the fluid. In this case, the fluid may be configured to change its electrical properties from an electrical insulator to an electrical conductor when exposed to an electric field. For example, the fluid may be an ionisable fluid (e.g. ionisable gas such as a noble gas or air). In one embodiment, the ionisable fluid forms a plasma (e.g. thermal or non-thermal plasma) when exposed to the electric field. In another embodiment, the fluid may be a polarisable fluid or a fluid comprising alignable conductive particles (e.g. molecules) dispersed in a non-conductive fluid. In one embodiment, the electric field generated between the opposed pair of conductor sub-regions is configured to generate the localised region of electrical conductivity in the fluid.

In one embodiment, the apparatus may be configured to ionise the fluid (e.g. ionisable gas) in a localised region between the first and second conductor regions. In one embodiment, the electric field generated between the first and second conductor regions is configured to ionise the fluid (e.g. ionisable gas). In one embodiment the electric field generated between the first and second conductor regions is configured in a first mode of operation to stress the fluid beyond its dielectric limit (e.g. to generate a plasma).

The apparatus may be further configured to sustain ionisation of the fluid (e.g. ionisable gas). In one embodiment, the apparatus may be configured to apply a sustain voltage to maintain ionisation of the fluid. For example, the electric field generated between the first and second conductor regions may be configured in a second mode of operation to maintain ionisation of the fluid (e.g. by controlling voltage applied to the first and second conductor regions with first and second control terms, with the first control term corresponding to the voltage required for a demanded force/torque and the second control term being a modulation of the first control term to sustain ionisation of the gas). In another embodiment, the apparatus may further comprise a sustaining device for sustaining ionisation of the fluid. In one embodiment the sustaining device may comprise a photon source.

The conductor sub-regions may each comprise an exposed periphery substantially free from sharp edges (e.g. with substantially rounded corners and/or edges) for minimising occurrence of electrical stress around the exposed periphery. In this way, the risk of corona discharge may be reduced.

The or each inner part may be separated from each adjacent conductor part by a running clearance of less than 0.5 mm.

The apparatus may further comprise positioning means for maintaining a predetermined minimum spacing between the inner part and the conductor parts of the or each capacitor assembly.

In one embodiment the positioning means comprises a pressurised fluid system configured to apply a balancing fluid pressure between (e.g. substantially evenly between) opposed (radial) faces of the (or each) inner part and the conductor parts (e.g. to opposed faces of the or each inner part) for correcting or preventing any offset displacement of the inner part(s) relative to the conductor parts. In one embodiment, the pressurised fluid system is configured to provide fluid at a pressure above atmospheric pressure (e.g. greater than 1.1 bar). In one embodiment, the pressurised fluid system is configured to provide fluid at a pressure of 1.1 to 6 bar. By using a pressurized system, low friction running under high and fluctuating forces may be achieved. In addition, pressurised fluid passing through the apparatus may be used to provide active cooling of the apparatus and prevent (or at least reduce) ingress of contaminants into the system by virtue of differential pressure.

The fluid (e.g. gas or liquid) may be a fluid as previously defined above.

The pressurised fluid system may comprise a pressurised fluid source.

In one embodiment, the fluid pressure system is configured to provide a force for counteracting (e.g. substantially counteracting) electrical forces (e.g. attractive electrical forces) between the inner part and the conductor parts (e.g. axial forces in the case of apparatus configured to convert between electrical energy and rotary motion). In addition, the fluid pressure system may be configured to provide a force for counteracting (e.g. substantially counteracting) externally induced forces (e.g. externally induced axial forces) that act to reduce separation between the inner part and the conductor parts.

The fluid pressure system may be configured to provide a load-supporting force for maintaining the inner part in a predetermined position (e.g. radial position in the case of apparatus configured to convert between electrical energy and rotary motion) relative to the at least one conductor part (i.e. static conductor part). In this way, the fluid pressure system may function to perform as a fluid bearing system between the moving and static parts of the apparatus for maintaining the inner part in a predetermined position relative to the at least one conductor part even under externally induced forces. When used as a fluid bearing system, the fluid pressure system may provide fluid at a higher pressure than when used only to counteract electrical forces between the inner part and conductor parts. Accordingly, a low viscosity fluid may be required to minimise drag losses caused by shear stress in the fluid (e.g. air with a dielectric constant of about 1 or carbon dioxide with a dielectric constant of about 1.6, or another suitable fluid).

In one embodiment, the fluid pressure system comprises at least one pressurised fluid channel in fluid communication with the pressurised fluid source for supplying pressurised fluid to an adjacent inner part. The at least one pressurised fluid channel may comprise a passageway or passageways configured to provide a predetermined pressure drop as fluid passes therethrough and an outlet into the passageway. In one embodiment, the outlet is adjacent an underside of the inner part. In another embodiment, the outlet is adjacent a face of the inner part. In the case of an outlet adjacent a face of the inner part, the fluid system may comprises a plurality of evenly distributed outlets (e.g. evenly distributed circumferentially around the axis of rotation in a rotary machine).

The pressurised fluid system may be configured to vary the fluid pressure (e.g. in dependence upon a force/torque demand placed on the apparatus and/or rotor rotation speed in apparatus for converting between electrical energy and rotary motion). In one embodiment, the fluid pressure is configured to be proportional (e.g. substantially directly proportional) to force/torque demand. In this way, the restoring force provided by the pressurised fluid system may be used to counter large electrical forces generated within the apparatus when there is a high force/torque demand.

In the case of a rotary machine comprising a plurality of rotatable discs acting as rotors, the rotatable discs may in use provide a pumping effect (resulting from boundary layer interactions between the surface of the discs and the pressurised fluid which may be significant at high rotational speeds) for drawing fluid from the pressurised fluid source. In the case that the pressurised fluid source comprises a pump, this pumping effect generated by movement of the rotors may advantageously reduce the load on the pump.

A further advantage of the pressurised fluid system is that of ingress protection. By ensuring the inner pressure is always above ambient or atmospheric pressure, the machine is protected from ingress of contaminants such as water or dust.

At least one of the previously defined conductor parts and/or inner parts may comprise a coating (e.g. hard-wearing coating). For example, at least one of the previously defined conductor parts and/or inner parts may be coated with a ceramic coating (e.g. titanium dioxide, barium titanate, strontium titanate or titanium oxide) or a coating of diamond-like carbon or a polymer coating. The coating material may be selected for its permittivity attributes and/or its hard-wearing/low friction properties. The coating may have a thickness of less than 100 microns (e.g. less than 50 microns). For example, the coating may have a thickness of between 5-10 microns. The coating may have a thickness which is greater than the spacing between the inner part and conductor parts of the or each capacitor assembly (i.e. the spacing defining the running gap clearance between adjacent outer surfaces of the inner and conductor parts). For example, the coating may be at least three times thicker than the minimum spacing between the inner part and the conductor parts of the or each capacitor assembly (e.g. spacing between the inner part and the outer surface of the coated conductor part if the conductor part comprises the coating). In this way, the magnitude of any offset force generated by displacement of the inner part may be constrained to a level proportional to the relative thickness of the coating to the running gap between the inner and conductor parts.

The coating may have physical attributes that provide for both hard-wearing/low friction along with relatively high dielectric constant. For example, in one embodiment the coating has a relative permittivity higher than 5. In one embodiment the coating material is titanium oxide which has a dielectric constant of 30 to 50 whilst being suitably hard and low friction. Advantageously, the provision of a coating with a relatively high dielectric constant allows use of a fluid with a low dielectric constant such as air (e.g. clean dry air) as the fluid in the fluid pressure system defined above with minimal reduction in total permittivity. In another embodiment diamond-like carbon is used principally for its hardness and low friction. Diamond-like carbon has a poor dielectric constant and so may be applied in the thinnest of coating thickness possible so as to prevent reduction in active field strength in the inner part (e.g. when used with a fluid having a high relative permittivity). A double-layer ceramic coating may be used whereby a top relatively thin layer of relatively hard low-friction material such as diamond-like carbon is applied to a thicker higher permittivity material such as titanium dioxide. In this way the best attribute of each material is utilised.

In one embodiment there may be substantially zero clearance between the conductor parts and inner parts in the or each capacitor assembly. In this way, the coating may act to substantially maintain the inner part in a predetermined central position relative to the conductor parts (e.g. in an axially central position along an axis of rotation) and thus minimise any axial forces that result from an off-centred inner part. In one embodiment, at least one of the conductor parts and/or inner parts may comprise a coating (e.g. hard-wearing coating) having at least one electrically conductive region. For example, one of the parts (e.g. one of the conductor parts) may comprise a diamond-like carbon coating configured to provide at least one electrically conductive region. In this way, a hard-wearing, low friction surface may be provided with an electrical connection between the inner and conductor parts thereby reducing or even eliminating any loss of electric field intensity in the region of the coating.

In another embodiment the apparatus may be moveable between a first configuration in which clearance between the inner part and at least one conductor part is substantially zero and a second configuration in which clearance between the inner part and the conductor part(s) is non-zero. In this embodiment, opposed surfaces of the inner part and at least one conductor part may be configured to provide sufficient contact friction to hold the inner part in position relative to the at least one conductor when the apparatus is in the first configuration. The parts may then be released as the apparatus moves into the second configuration to allow free running of the inner part relative to the at least one conductor part. In this way, "clutch plate" friction between the parts may be used to provide a handbrake (e.g. in a wheel motor system incorporating the apparatus of the present invention).

In one embodiment, the apparatus may be moveable between the first and second configurations by a change in fluid pressure (e.g. with low or zero relative pressure with respect to the atmosphere causing the parts to be in the high friction state of the first configuration and application of an increased fluid pressure resulting in a gap being formed between the parts to enable the low friction running of the second configuration).

In another embodiment, the movement between the first and second configurations may be implemented by the piezoelectric response of the inner part to the electric field generated in the apparatus (e.g. with the application of an electric field causing a contraction of the axial dimension of the inner part to enable the low friction state of the second configuration). Where the first or second conductor part comprises a polarisable region as defined above for the purpose of providing local static capacitance, the polarisable region will have the same piezoelectric properties as the inner part and so can also contribute to the contraction that creates the low friction running effect of the second configuration.

In one embodiment, the or each inner part is additionally moveable (or has a part which is moveable) in a direction normal to the path through the passageway. For example, in the case of apparatus for converting between electrical energy and rotary motion the or each inner part (or a part thereof) may be additionally moveable parallel to an axis of rotation of the inner part. In this way, the or each inner part is able to obtain a position of least resistance to movement (e.g. of least resistance to rotation) between the conductor parts. In the case of an inner part comprising a plurality of first and second regions spaced along the path, different parts of the inner part may be independently moveable in a direction normal to the path through the passageway. In the case of multiple inner parts, each inner part may be independently moveable in a direction normal to the path through the passageway and further passageway respectively. In this way, thermal and manufacturing positional tolerances and changes can be accommodated by low-level movement of each inner part. In one embodiment, the or each inner part may be moveably mounted to a frame which is fixed relative to the at least one conductor part.

In one embodiment, at least one conductor part forms a ground plane element. In this way, the at least one conductor part may act as electrostatic screen to the outside world (e.g. if used as the first and last conductor part in a series of three or more conductor parts). In one embodiment, the conductor parts alternate between conductor parts forming a ground plane element and conductor parts not forming a ground plane element (e.g. phase addressable element). For example, the apparatus may comprise pairs of opposed conductor parts forming phase addressable elements and adjacent pairs of opposed conductor pairs forming ground plane elements located between end conductor parts (e.g. electrostatic screening conductor parts).

At least one conductor part may be coupled to a base structure. In the case that the at least one conductor part forms part of a stator, the stator may be coupled to the base structure. The base structure may be configured to transfer forces/torque experienced by the at least one conductor part to a ground (e.g. fixed ground) mechanical connection. The base structure may be electrically insulating.

In the case of apparatus for converting between electrical energy and rotary motion, the base structure may be sectioned to provide for ease of assembly in the axial direction. In another embodiment, the base structure may be diametrically sectioned to provide for ease of assembly in a radial direction.

The base structure may incorporate flow and return pathways for the pressurised fluid system. In the case of air, the return may be to atmosphere through an interface (e.g. contact seal interface) between fixed and moving parts of the apparatus. Advantageously, the venting of air to atmosphere may help to minimise seal wear (if a contact seal interface is used) and to provide a positive pressure preventing ingress of contaminants.

The conductor parts may be configured with conductive sections and tracks to provide for interconnections between adjacent conductor parts. For example, in the case of apparatus for converting between electrical energy and rotary motion, the conductor parts may be configured to provide for interconnections between a plurality of conductor parts axially spaced along an axis of rotation of the inner part.

The conductor parts may be configured with conductive sections and tracks to provide for interconnections between circumferentially distributed and repeating capacitor phases.

In one embodiment, at least one conductor part comprises a connector for linking together a plurality of sub-regions in a group of a conductor part. In addition, in the case of first and further defined capacitor assemblies spaced along an axis the apparatus may further comprise an axially extending connector linking groups of sub-regions in different conductor parts. In this way, an activation voltage may be applied to one location on the at least one conductor part and may be distributed to each of the sub-regions linked in the group. Accordingly, assembly of the capacitor assemblies on a common axis may align and couple, or allow for the coupling of, like phase connections axially irrespective of how many axially spaced capacitor assemblies are to be included in the apparatus. In one embodiment, each further capacitor assembly comprises at least one conductor part comprising a further connector for linking a plurality of sub-regions in each group of the conductor part. The connector and further connector may be configured to receive the activation voltage at a (e.g. single) common location (e.g. axially alignable common location in the case of apparatus for converting between electrical and rotary motion defining a rotary axis). For example, each connector may comprise a conductor path extending between sub-regions. In one embodiment, every sub-region in a group is connected by the connector (e.g. a connector extending circumferentially between each sub-region). In this way, only one set of connections need be made to connect the entire assembly.

In one embodiment, a connector connecting sub-regions in a group on a conductor part is provided on an adjacent conductor part. For example, the connector may comprise a conductor path extending circumferentially around the adjacent conductor part. The connector may be configured to link to the sub-regions in the conductor part by means of a plurality of conductive contacts.

Regardless of whether the apparatus comprises one capacitor assembly or more, the conductor parts may be spaced along an axis and the apparatus may further comprise an axially extending connector (i.e. extending with a component parallel to the axis) for linking different conductor parts (e.g. linking groups of sub-regions in different conductor parts as described above). The connector may comprise one or more elongate connector pins configured to extend though a plurality of conductor parts. In the case of apparatus for converting between electrical energy and rotary motion, the connector may comprise a plurality of circumferentially spaced connector pins extending axially through the apparatus. The connector pins may comprise an electrically conductive body for transmitting an activation voltage.

In the case of a conductor part comprising a connector for linking together a plurality of sub-regions in a group of a conductor part, a plurality of axially extending connectors (e.g. elongate connector pins) may be linked to the connector (e.g. in the case of a rotary machine linked at a plurality of circumferentially spaced points). In this way, a multi-parallel connection path may be provided to ensure continued operation even if some of the multiple connections were to fail in use.

In addition to transmitting an activation signal (e.g. activation voltage), the connector pins may additionally be configured to transfer forces or torque generated by the apparatus. For example, the connector pins may be substantially rigid. Advantageously, a plurality of circumferentially spaced connector pins may be used to distribute local stress around the apparatus in order to increase reliability by avoiding cyclic application of torque in a localised part of the apparatus. Each connector pin may be configured to pass through all conductor parts (e.g. to provide torque transmission to the connector pin ends at opposed sides of the apparatus and to locations between each conductor part and to the base structure of the apparatus).

In one embodiment, the conductor parts are configured to maintain a predetermined orientation relative to a fixed reference of the apparatus. For example, in the case of apparatus for converting between electrical energy and rotary motion, the conductor parts may be configured to maintain a predetermined orientation relative to an axis of rotation of the inner part.

In one embodiment, positioning of the or each inner part relative to at least one conductor part (e.g. rotor position or the electrical angle corresponding to the rotor position in apparatus for converting between electrical and rotary motion) is detected by a sensor (e.g. internal sensor). In order for the voltage applied to be timed to coincide precisely with the position of the inner part relative to the conductor parts, it may be necessary to identify the position of the inner part with accuracy. The sensor may be used to provide feedback about the position of the inner part (e.g. angular position) so that a control system for the apparatus may determine when to apply voltage, and at what level to apply the voltage, during each phase of the cycle. In addition, positional feedback from the sensor may be used to provide information about the speed of the inner part (e.g. for use in determining a speed of a vehicle powered by the apparatus).

In one embodiment, the sensor comprises a passive sensor (e.g. passive optical sensor). For example, the sensor may comprise one or more (e.g. two) fibre optic cables for detecting relative positions of the parts (e.g. rotor position or the electrical angle corresponding to the rotor position in apparatus for converting between electrical and rotary motion) by reference to an optical reference (e.g. reference ring). In the case of two fibre optic cables, the optical sensors may be configured to return positional information in sine and cosine form. Processing electronics at a control system of the apparatus may be configured to decode the data and provide the control system with angular and velocity feedback. Advantageously, the use of passive optical sensors provides a positional feedback system substantially immune to internal electrical noise within the high voltage parts of the apparatus. By using two such sensors, either of the sensors can fail whilst the positional feedback system continues to function.

In another embodiment, positioning of the or each inner part relative to at least one conductor part (e.g. rotor position or the electrical angle corresponding to the rotor position in apparatus for converting between electrical and rotary motion) is determined by monitoring changes resulting from variation in capacitance of the capacitor assembly during cyclic operation of the apparatus. For example, the charge current for a given applied voltage may be monitored to determine the position (at least in electrical terms) in the cycle. This technique for monitoring the relative positioning of the parts makes use of the intrinsic variation in capacitance level of the capacitor assembly as the first region of the inner part moves into and out of alignment with the conductor sub-regions. The angular position within any electrical cycle can be determined and used to determine the appropriate applied voltage without the need for a dedicated feedback sensor.

In one embodiment, the apparatus may be powered by a supply voltage (e.g. varying or non-varying supply voltage) which is of the order of 10s to 1000s of Volts. In another embodiment, the apparatus may be powered by a supply voltage (e.g. varying or non-varying supply voltage) which is greater than 10,000 V. For example, the apparatus may be powered by a non-varying supply voltage of around 40,000 V. In another embodiment, the apparatus may be powered by a varying supply voltage. For example, the apparatus may be powered by a varying sinusoidal voltage. The varying voltage may have a peak voltage of up to 50,000 V.

In one embodiment, the supply voltage may be electronically commutated with respect to a position of the inner part relative to the at least one conductor part to provide a varying activation voltage to the first and second conductor parts.

In one embodiment the activation voltage may be sinusoidal. In another embodiment the apparatus may be powered by a varying voltage which is not sinusoidal. The use of a non-sinusoidal voltage may have advantages within a machine that has no intrinsic electret attributes since in this case the machine generates positive force only when the high permittivity material is entering the zone between the conductor regions. As there is no prospect of force on the exit of the high permittivity material from the zone of the conductor regions, a sine wave may not be optimum in such a machine. In this case, a unidirectional waveform may be more appropriate (e.g. a waveform which is never negative or never positive). The unidirectional waveform may comprise a series of pulses spaced by periods of substantially zero voltage (i.e. corresponding to periods in which a sub-conductor plate pairing is inactivate). The pulses may have a faster rising edge than trailing edge to take account of the varying capacitance provided by the inner part as the inner part and conductor parts change alignment during a cycle.

In one mode of operation, the charge on each conductor part is maintained at a non-zero voltage level (e.g. high voltage level) but varied between a high level and low level voltage. Whilst such operation inevitably causes a drag force due to the lower level voltage presence, this may be more than counteracted by the increased force of the higher voltage levels on other phases at the same time. As force is a function of voltage squared, operation can occur at a higher average voltage level with retained charge drag being overcome by the higher force of the higher voltage. Compared to operation where the voltage is brought to zero each cycle, an increase in average torque may advantageously be achieved.

The voltage supply may be derived from a dc storage source (e.g. a battery or capacitor). In one embodiment, the voltage supply is configured as a cascade of a plurality of low level voltage sources electronically switched so as to provide a controllable multi-phase high voltage supply to the apparatus.

In one embodiment, the conductor parts are sufficiently strong to withstand any resulting axial force created by the electric field (e.g. without reinforcement).

In one embodiment at least one conductor part forms a ground plane element. For example, the stator parts may alternate between conductor parts forming a ground plane element and conductor parts not forming a ground plane element. The benefit of having plane ground elements is firstly to provide for a common return connection—for example as in a three-phase star point thus providing for a parallel connection of the conductor regions to the power supply—and secondly to obviate the need to switch both sides of adjacent capacitor assemblies.

In one embodiment the conductor parts form a stator split diametrically into two parts, whilst in another embodiment the conductor parts form a stator comprises a series of axially stacked sections. In the latter case the assembly of the stator is carried out alternately with the inner parts so that they interpose. In the former case, the inner parts can be fully assembled and the two stator halves then assembled around them.

At least one of the inner and conductor parts may be segmented. For example, in the case of apparatus for converting between electrical and rotary energy the inner and conductor parts may comprise segmented (e.g. circumferentially segmented) annular parts. In this way, issues associated with thermal expansion and contraction of large diameter annular form components may be avoided or at least reduced. In one embodiment, the segmented annular parts each comprise an arcuate segment and circumferentially spaced segment edges of each arcuate segment are arranged to be non-radial. In this way, the risk of interference between the segmented inner and conductor parts may be avoided since edges of the inner part will pass the conductor parts in a progressive manner. In the case that opposed inner and conductor parts each have non-radial segment edges the edges may be swept at different angles (e.g. with the edges of opposed parts being swept in opposed directions if both edges are swept relative to the radial direction). In an analogous manner, edges of the conductor sub-regions may be swept at relative to the radial direction (e.g. to minimise interference with the inner part if the conductor sub-regions protrude relative to surrounding parts of the conducting parts). Edges of the first or second regions of the inner part may similarly be swept relative to the radial direction (e.g. to minimise interference with the conductor parts if the first or second regions protrude relative an adjacent region of the inner part).

In addition, the segmented annular parts may comprise axially connected pairs of arcuate segments which are configured to provide a substantial degree of pressure isolation between each face of the segment assembly, for example by use of a partial circumferential overlap. In this way, a degree of pressure isolation may be provided when used with the pressurised fluid system defined above.

In the case of a rotary device in which the first and second conductor parts form part of a stator and the inner part forms part of a rotor, the stator may be coupled (e.g. rigidly coupled) to a fixed shaft and rotor may be configured to rotate around the shaft (e.g. by means of one or more bearings). In one embodiment, the rotor defines a pair of axially spaced elongate arms (e.g. forming axially outermost ends of the rotor) each configured to rotate around the shaft. In one embodiment, the pair of axially spaced arms are axially rigidly attached (i.e. to prevent relative movement along the axis of rotation) to outer races of a pair of bearings (e.g. a pair of axially symmetric bearings) and the stator is axially rigidly attached to inner races of the pair of bearings. In this way, the effects of thermal expansion may be reduced by ensuring axial displacement occurs uniformly about the axial centre line of the apparatus (e.g. effectively halving the impact on running clearance between the inner and conductor parts compared with an axially-fixed/axially-moveable bearing pairing).

In accordance with a second aspect of the present invention, there is provided a motor for mounting in a wheel (e.g. vehicle wheel) comprising apparatus as defined in any of the previous embodiments.

In accordance with a third aspect of the present invention, there is provided a wheel for a vehicle comprising the motor of the second aspect of the invention.

In accordance with a fourth aspect of the present invention, there is provided a sensor/detector transducer comprising apparatus as defined in any of the embodiments of the first aspect of the invention.

In accordance with a fifth aspect of the present invention, there is provided a method of connecting (e.g. electrically connecting) elements in apparatus for use as a motor or generator, the apparatus comprising: a first part comprising a plurality of first elements spaced along a first path and a second part spaced from the first part along an axis of the apparatus and comprising a plurality of second elements spaced along the second path, the method comprising the steps of: connecting a first phase group of spaced first elements using a first connector; connecting a second phase group of spaced first elements using a second connector; connecting a first phase group of spaced second elements using a third connector; connecting a second phase group of spaced second elements using a fourth connector; connecting the first phase group of spaced first elements to the first phase group of spaced second elements using a first axially extending connector; and connecting the second phase group of spaced first elements to the second phase group of spaced second elements using a second axially extending connector.

In one embodiment, at least one of the first and second axially extending connectors may comprise one or more elongate connector pins configured to extend though the first and second parts. The or each connector pin may comprise an electrically conductive body for transmitting an activation voltage. The connector pins may additionally be configured to transfer a force or torque generated by the apparatus. For example, the connector pins may be substantially rigid.

In the case of a rotary device, the axis of the apparatus may comprise an axis of rotation of the first and second parts. The first and second elements may be circumferentially spaced around the axis of rotation of the first and second parts (i.e. with circular first and second paths defining a circumferential path centred around the axis of rotation).

The apparatus may comprise apparatus as defined in any of the preceding aspects of the invention.

In accordance with a sixth aspect of the present invention, use of apparatus as defined in any of the preceding aspects of the invention as a motor. In one embodiment, the apparatus may be used as a direct drive motor (i.e. without a gear box).

The apparatus of the present invention may be used in any application requiring a motor, including but not limited to the following list of applications:

wheel-driven vehicles (e.g. road vehicles such as passenger cars, vans, motor bikes and motor scooters). In this application the light weight, high torque and high efficiency potential of the apparatus is ideally suited to such vehicles. In addition, the apparatus also provides for the possibility of a vehicle having no mechanical brakes and thus maximum energy recovery and journey distance. The motor of the present invention may also be of particular use in high torque vehicles such as heavy trucks/land transport vehicles, earth moving equipment and tractors. Advantageously, the potential of the apparatus of the present invention to directly drive heavy vehicles (i.e. with no gearbox) provides the possibility of considerable energy savings and longer journey distances. Furthermore, the comparatively simple construction and reduction in wearing parts provided by such a direct drive vehicle may reduce manufacture and maintenance costs.

rotor-driven aircraft (e.g. helicopters). In this application, the apparatus of the present invention may advantageously be used to provide a direct drive for a rotor (e.g. helicopter rotor). A high torque, high speed variable direct drive would allow a fixed pitch rotor design and so eliminate the mechanical complexity and associated reliability risk. Fast response speed/torque changes would further advantageously increase agility of the helicopter.

propeller-driven aircraft. The potential for the apparatus to provide a light weight and high torque with variable speed motor allows simple propeller design with no need for variable pitch controls.

propeller driven ships. The potential for providing a high torque motor that can be constructed with an annular form in an almost infinite range of diameters allows direct mounting around a propeller shaft of a ship. Advantageously, a plurality of motors may be mounted in series along a single shaft to provide redundancy and high low power ratings.

conveyor drives (e.g. elevator or escalator drives, winches or powered tow lines). High efficiency and high torque advantageously allow direct drive. In the case of elevators, direct drive may be coupled with maximum energy recovery during elevator descent, leading to the potential of significant power savings.

accelerator devices (e.g. a linear accelerator for accelerating an object prior to release of the object). The apparatus of the present invention provides the potential to for efficiently delivering very high forces in a compact space.

In accordance with a seventh aspect of the present invention, use of apparatus as defined in any of the preceding aspects of the invention as a generator. In one embodiment, the apparatus may be used as a direct drive generator (i.e. without a gear box).

In one embodiment, the apparatus of the present invention may be used in a wind turbine wind (especially vertical axis units) or wave turbine, e.g. generators mounted to fixed prime movers. Advantageously, the apparatus of the present invention may be used as a generator without a transformer (typically wind turbines require a transformer between generator and grid) as the apparatus can be configured to output high voltage at various levels. Furthermore, the apparatus of the present invention provides the potential to provide a very high efficiency direct drive generator.

In accordance with a eighth aspect of the present invention, use of apparatus as defined in any of the preceding aspects of the invention as a sensor/detector transducer.

BRIEF DESCRIPTION OF THE DRAWINGS

Embodiments of the present invention will now be described by way of example with reference to the accompanying drawings in which:

FIGS. 11 and 12 show schematic representations of alternative pressurised fluid systems for use in the machine of FIG. 9A;

DETAILED DESCRIPTION

Figure 1:
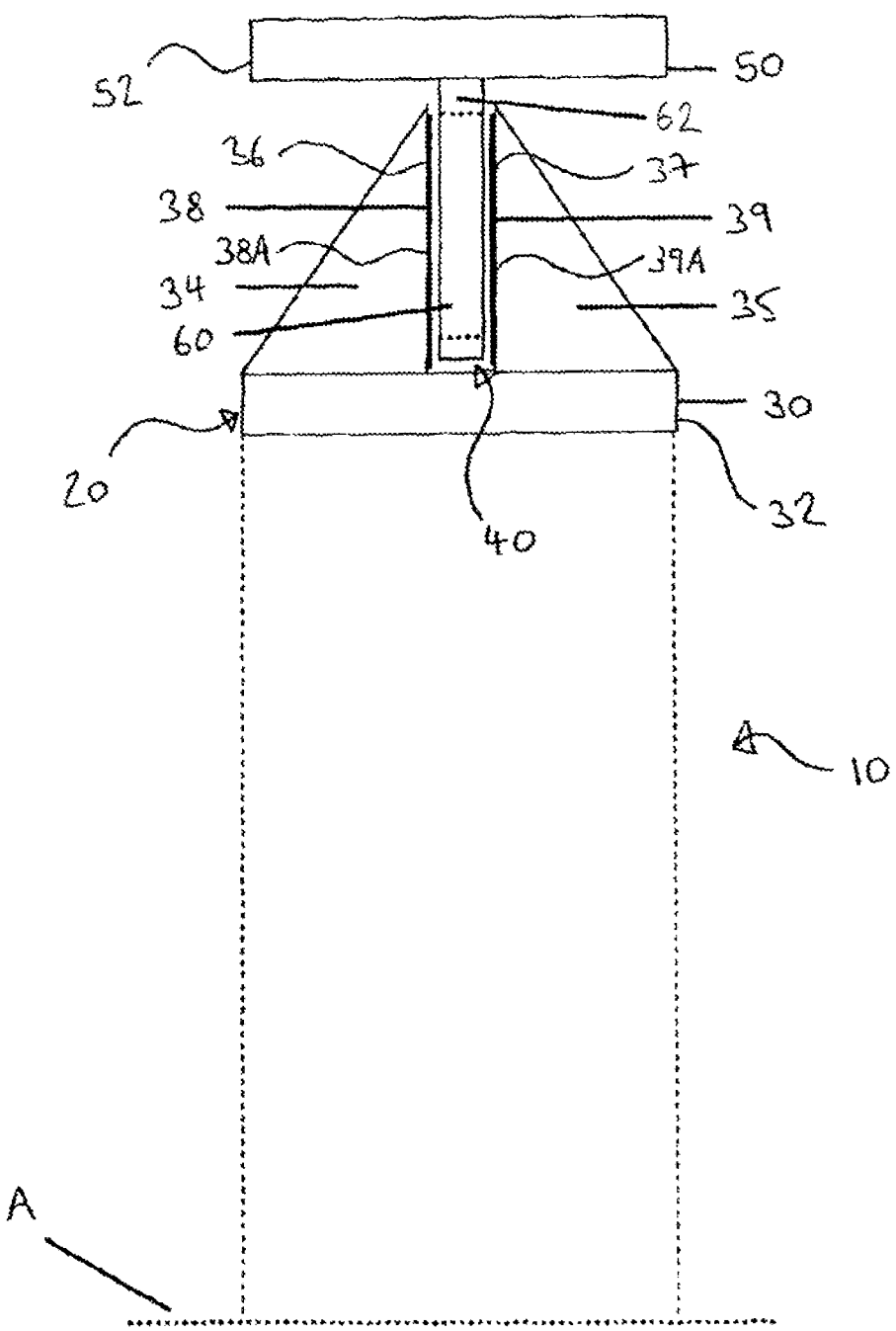
FIG. 1 shows a schematic cross-sectional side view of a machine according to a first embodiment of the present invention.
Figure 2:
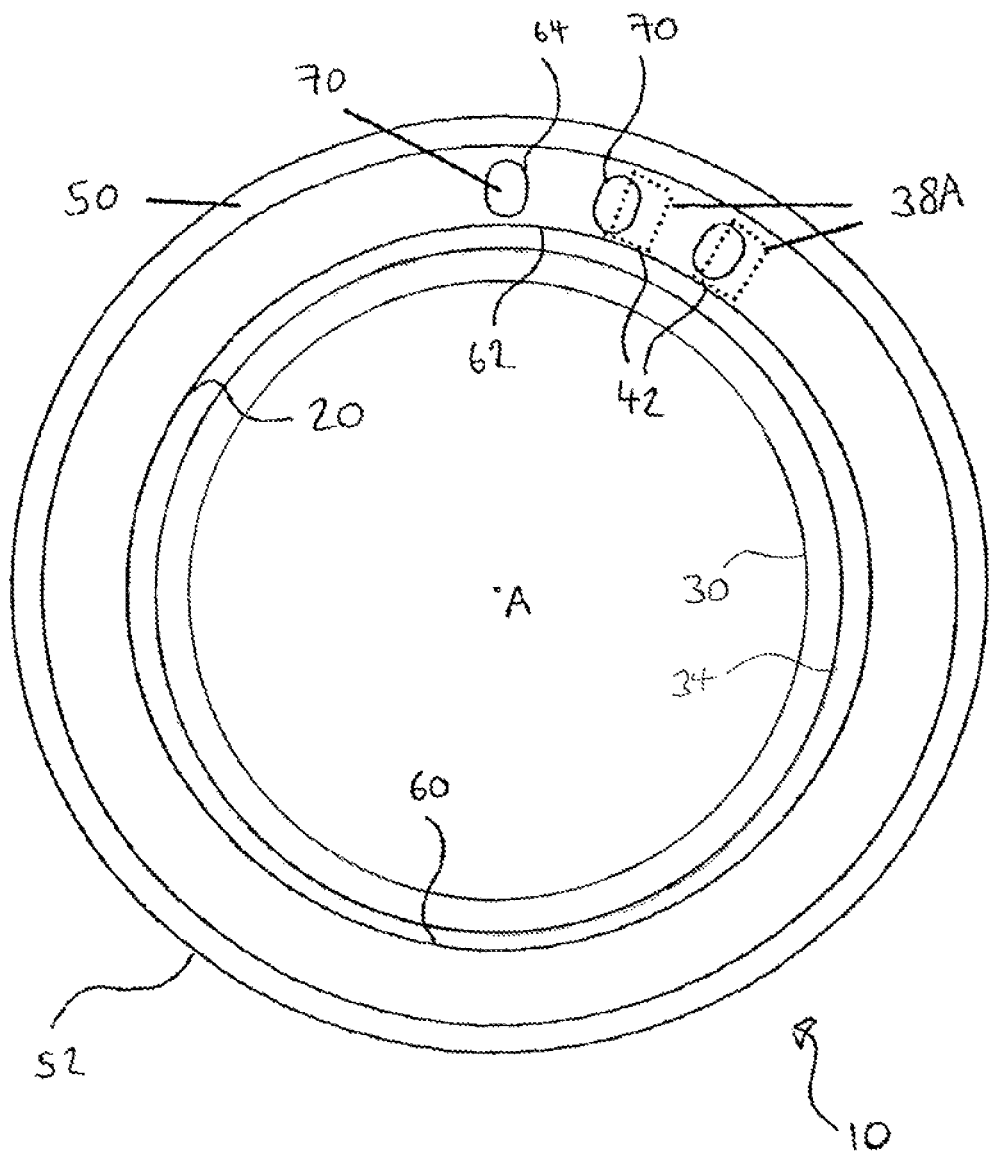
FIG. 2 shows a schematic front view of the machine of FIG. 1.

FIGS. 1 and 2 show a rotary machine 10 comprising a capacitor assembly 20 configured to convert electrical energy into rotary motion and vice versa. Rotary machine 10 comprises a stator 30 and a rotor 50 rotatably mounted around the stator 30 to form a capacitor assembly 20. In use, rotor 50 is configured to follow a circular path about a central axis of rotation "A" extending through the centre of stator 30. A central or outer diameter bearing system (not shown) supports the rotor 50 during rotation about the stator 30. Rotary machine 10 works with either AC or DC voltage with the DC voltage half-wave rectified.

Stator 30 comprises an annular stator body 32, a first electrically insulating stator part 34 extending radially from the stator body 32 and comprising a first annular surface 36 supporting a first conductor region 38 and a second electrically insulating stator part 35 extending radially from the stator body 32 comprising a second annular surface 37 supporting a second conductor region 39, the first and second stator parts 34, being spaced apart to define opposed sides of a passageway 40 extending between the first and second conductor regions 38, 39. The first conductor region 38 comprises a plurality of discrete first conductor sub-regions (or plates) 38A, with the sub-regions being circumferentially spaced evenly along the circular path around rotational axis "A"; the second conductor region 39 comprises an annular conductor region 39A extending between each of the first conductor sub-regions 38A and forming a ground plane. However, in another embodiment, the second conductor region 39 may also comprise a plurality of discrete second conductor sub-regions (or plates) with each of the first conductor sub-regions being registered with a corresponding second conductor and region.

Each sub-region 38A, 39A comprises a conductive plate 42 comprising a suitable metallic material such as aluminium, titanium or magnesium. This allows for a durable and strongly attached ceramic coating to be subsequently applied (see discussion below).

Each conductive plate 42 can be applied in one of several ways for example, plasma spray, electron vapour deposition, or can simply be formed using a suitable etching process (e.g. as in printed circuit board production).

Rotor 50 comprises an annular rotor body 52 and an insulator part 60 extending from the rotor body 52 into passageway 40. Insulator part 60 comprises a substantially annular low permittivity (i.e. relatively low electrical polarisation potential) rotor frame 62 defining a plurality of evenly circumferentially spaced apertures (or cut-outs) 64 each housing a high permittivity (i.e. relatively high electrical polarisation potential) region 70 (e.g. with the high permittivity regions arranged in a spoke-like configuration) to form circumferentially alternate sections of high and low permittivity uniformly distributed around the central axis of rotation "A". However, in another embodiment the insulator part may comprise a pressed part having the high permittivity regions formed therein during the manufacturing process (e.g. using a powdered ceramic process).

Each high permittivity region 70 may have a similar circumferential dimension to the spacing between each adjacent high permittivity region and a thickness substantially equal to the rotor frame 62. The insulator part 60 may have a thickness of between 0.5-8 mm or greater depending on the scale of the machine.

The rotor frame 62 may comprise a non-conductive, low permittivity material such as Glass-reinforced Plastic (GRP), Peek, ceramic, or any mechanically sound good electrical insulator which has a relative permittivity of low value, ideally less than 5. Each high permittivity region 70 may comprise a high permittivity material such as the ceramic material barium titanate where the permittivity is of the order of 1000-5000. There are classes of material which embody both ceramic and polymers to the extent that the permittivity of the high permittivity regions can be increased to higher levels, for example around 100000. A further property of both the rotor frame 62 and high permittivity region 70 materials is that they have good dielectric strengths. Whilst the design of the embodiment described has minimum dependence on any need for exceptional dielectric strength since the insulator part 60 forms an insulating barrier between the first and second stator parts 34, 35, it nevertheless is desirable from the standpoint of long life expectancy.

The high permittivity regions 70 may be suitably secured in the rotor frame 62 by use of an adhesive and/or other fixing means. For example, the rotor frame 62 may comprise two connectable half parts (e.g. two discs). The two half parts may then be bonded together with the high permittivity material trapped therebetween (e.g. in a dovetail manner).

The Rotor 50 can be constructed using several of the insulator parts 60 described above, for example two or more can be stacked axially.

In use, machine 10 operates as a switched permittivity electrostatic rotary machine in which torque is developed by applying a high voltage across opposing pairs of first and second conductor sub-regions so as to develop an electric field (e.g. electrostatic field) therebetween. The electric field generated between a selected pair of first and second conductor sub-regions acts to polarise an adjacent high permittivity region to form an electric field having two alternative paths: a low permittivity path and a high permittivity path. This creates a circumferential stress that imparts a force on the adjacent high permittivity region to bring about alignment of the high permittivity region and adjacent conductor sub-regions, thereby causing the rotor 50 to rotate until the high permittivity region is aligned with the first and second conductor sub-regions. Once aligned there is no aligning force and hence at this point the rotor 50 creates no torque.

The machine 10 will operate either as a motor or a generator depending upon the timing of the voltage application and hence torque generation. For example, if voltage is applied to first and second conductor regions 38, 39 whilst a high permittivity region 70 is progressing into the electrical field produced at a conductor sub-region 38A then the machine 10 will generate "positive" torque and assist in motion—i.e. accelerate the rotor 50. However, if a high permittivity region 70 is leaving an area between the conductor sub-region 38A when the voltage is applied, then the effect is to attempt to pull the high permittivity region 70 back into the field producing negative torque—i.e. decelerate the rotor 50. Deceleration collects energy from the momentum of the rotating mass of the rotor 50, or the vehicle mass in the case that machine 10 is mounted in an electric vehicle (e.g. in a wheel of a vehicle). This energy is then materialised as a voltage over the supply voltage and causes current to flow back into the supply—i.e. generate electrical power.

Continuous rotation of the rotor 50 relative to the stator 30 may be achieved by sequentially applying a voltage across different pairs of opposing first and second conductor sub-regions or (as described in more detail below) by applying a voltage across different pairs of conductor sub-regions located either side of at least one further insulator part. Notably the machine 10 does not rely upon voltage polarity reversal for its rotating force. The machine 10 may have any number of drive phases across the full range of rotation (e.g. three drive phases per cycle).

At least two alternative conductor sub-region pattern types can be adopted depending upon which technique is used.

In the case of the first technique, conductor sub-regions may be arranged such that the number of conductor sub-regions in each conductor region differs to the number of high permittivity regions by a number that provides for full rotation of the rotor. In other words, in a three phase example, the conductor sub-regions in each conductor region may be arranged to connect to phase one, phase two and phase three sequentially around the circumferential direction. With a suitable disparity of number, for example three conductor sub-regions per conductor region to two high permittivity regions, a progressive and rotating alignment force is developed using a rotor with a single insulator part. For example, in the case of a three-phase cycle machine 10 may comprise 54 conductor sub-regions and 36 high permittivity regions (i.e. ⅔ of the number of conductor sub-regions), with conductor sub-regions 1, 4, 7, 10 etc may be activated during the first phase of operation. Conductor sub-regions 2, 5, 8, 11 etc are then activated during the second phase of operation. Finally, conductor sub-regions 3, 6, 9, 12 etc are activated during the third and final phase of the cycle. Both the conductor sub-regions and high permittivity regions may have 5 mechanical degrees circumferential dimension with the high permittivity regions being spaced circumferentially by 5 degrees. Spacing between conductor sub-regions may be selected to be a third of the spacing between the high permittivity regions (i.e. 1.6667 degrees) in order to ensure that a group of high permittivity regions overlap partially with nearby conductor sub-regions when another group move into alignment with conductor sub-regions having an activated electric field. This latter dimension may be different if an electret were employed instead of a high permittivity material.

The number of conductor sub-regions, relative number of high permittivity regions, angle and spacing are all geometric properties that are important to the efficient and smooth torque performance of any polyphase machine in an analogous way for example, to geometric properties of components in a switched reluctance electromagnetic machine. Thus, the person skilled in the art will understand the importance of these parameters and will be skilled in determining appropriate properties for machines of different size, phase number and operating frequency of the variable supply. There is a trade-off between the number of high permittivity regions (hence frequency and source impedance of supply to commutate at high speed) and torque capacity. Torque capacity increases with the number of high permittivity regions (i.e. with the number of active edges pulling or pushing) whilst the current needed to maintain voltage increases as frequency increases since the capacitive reactance of the machine is inversely proportional to frequency.

In the case of the second technique (i.e. for embodiments involving a rotor comprising two or more separately addressable insulator parts), the conductor sub-regions in each conduction region may be arranged to match the circumferential spacing of the high permittivity regions in its respective insulator part. Thus, in this configuration, when the high permittivity regions of a first insulator part are partially circumferentially aligned with the conductor sub-regions surrounding the first insulator part, a high voltage applied across the conductor sub-regions on either side of the first insulator part creates an electric field which acts to bring the high permittivity regions of the first insulator part into full alignment with corresponding pairs of first and second conductor sub-regions. A second set of conductor sub-regions located either side of a second insulator part are displaced circumferentially from the first and second sub-regions located either side of the first insulator part (e.g. by 120 electrical degrees for a three phase arrangement, though other phase arrangements and hence angular offsets are possible). When the high permittivity regions in the first insulator part have been brought into alignment with the first and second conductor sub-regions and the torque development has ceased, the second set of conductor sub-regions located either side of the second insulator part will have become progressively offset and thus take over the task of torque generation once a voltage is applied to these conductor sub-regions. This situation is repeated with a third set of conductor sub-regions on either side of a third insulator part being 120 electrical degrees displaced from the second set of conductor sub-regions and 240 electrical degrees from the first set of conductor sub-regions. Thus in a three phase manner, the rotor provides smooth torque across the full range of rotation.

The former embodiment may be the preferred alternative between the two options since it provides for a balance of axial force in any one angular position at any one time. The latter alternative results in varying forces along one axial path and this may have the consequence of imposing substantial axial forces on the inner stator discs.

Since it is desirable to keep the running clearances as small as possible, and as the attractive force increases with reduced clearance, the impact of any unwanted movement of parts in the machine may need to be mitigated in the design. Similarly differences in thermal expansion coefficients can lead to further imbalance in the forces acting on each side of a stator disc. To this end the following measures may be incorporated to ensure reliable operation under such conditions and effects.

One measure for increasing reliability is the provision of a hard-wearing surface (e.g. hard-wearing low friction surface). For example, the stator 30 and/or rotor 50 may comprise a ceramic or diamond-like carbon coating. A ceramic coating may allow a low friction and very hard-wearing surface, but requires a thickness of the order of less than 50 microns and typically around 5-10 microns. Thus for a small intrusion into the running gap a surface finish on the first and second stator parts ensures that should the rotor and stator come into contact, and this may in fact be a design intent to a certain degree, there will be little or no wear (particularly if the rotor also comprises ceramic elements). If the coating has a relatively high dielectric constant e.g. Titanium Dioxide (with a relative permittivity of 40-100), the coating thickness is less critical than with lower dielectric constant materials such as diamond-like carbon. The use of a coating (e.g. ceramic coating) has several advantages:

1) It prevents any metallic parts being in contact with any fluid. This prevents ionic contamination and degradation of insulation or dielectric properties.
2) It provides a hard wearing surface that resists erosion due to fast moving fluids.
3) It provides a low friction surface that prevents damage in the event that rotor to stator touchdown occurs.
4) It acts as a corona resistant additional insulation barrier.
5) It increases the stiffness of the stator plate and hence the stator ring—thereby helping to reduce stator flexure under high field/force/torque conditions.
6) Where the coating has a relatively high dielectric constant, it reduces the distance of low dielectric constant space between the inner (rotor) and the conductive sub region—thus improving the active electric field strength. This allows the ratio of coating thickness to running gap dimension to be maximised allowing the potential displacement of the insulator part to be minimised and hence the force between the conductor sub-region and the inner insulator part also to be minimised.

Figure 4:
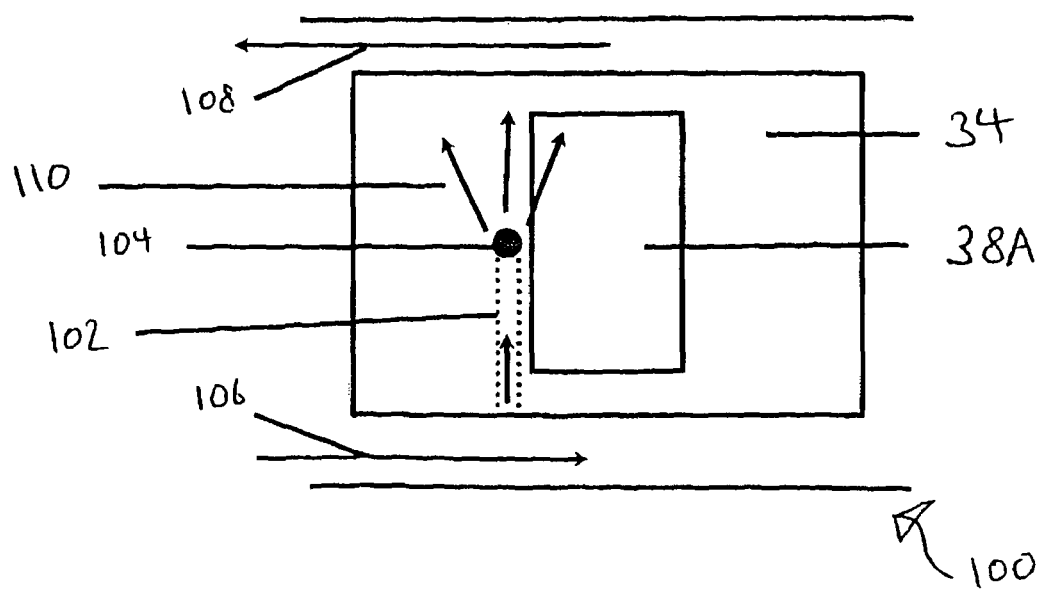
FIG. 4 shows a schematic representation of the pressurised fluid system for use in the machine of FIG. 1.

Another measure for increasing reliability is the inclusion of a pressurised fluid system 100 as shown in FIG. 4 for stabilising and maintaining the insulator part centrally between the first and second stator parts. Pressurised fluid system 100 comprises a pressurised fluid source (not shown) in fluid communication with a plurality of pressurised fluid channels 102 extending through the first and second stator parts 34, 35 for supplying pressurised fluid to outlet apertures 104 at each conductor sub-region 38A of each stator part. Each pressurised fluid channel 102 is supplied with pressurised fluid from the pressurised fluid source by a fluid inlet channel 106. One or more return path channels 108 are provided to allow pressurised fluid to be circulated in the system, each return path channel 108 comprising an inlet aperture (not shown). Each outlet provides a fixed flow resistance configured to provide a pressure drop approximately equal to the pressure drop experienced by the fluid as it passes though passageway 40 between outlet apertures 104 and the at least one inlet aperture of the return path channel(s) 108.

Figure 3:
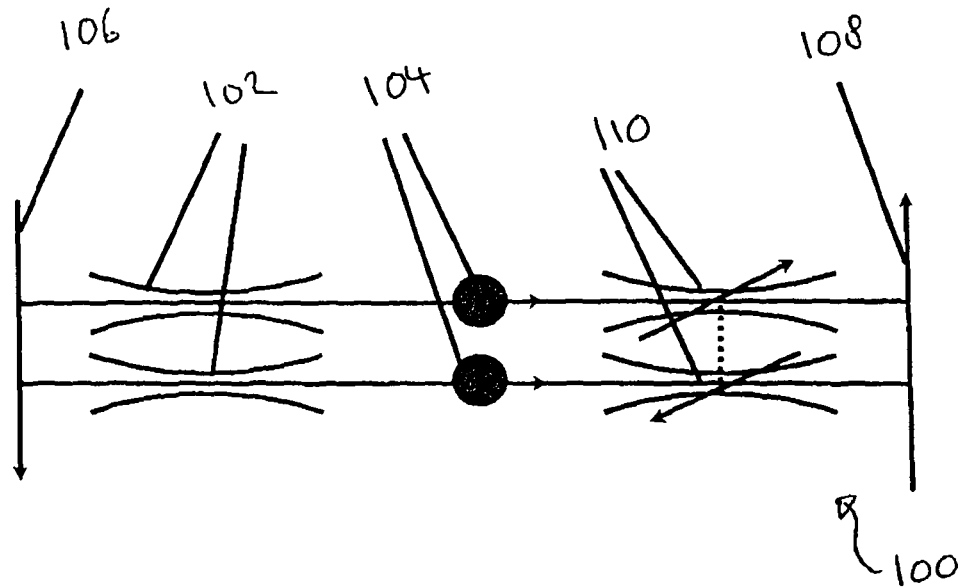
FIG. 3 shows a schematic diagram of a pressurised fluid system for use in the machine of FIG. 1.

As illustrated diagrammatically in FIG. 3, the pressurised fluid system 100 acts to form a hydraulic Wheatstone bridge configured to provide a centring force that keeps the insulator part 60 axially central between the first and second stator parts 34, 35. As the insulator part 60 moves away from one stator part, the pressure drop across the variable resistance zone 110 of the rotor/stator gap on one side reduces and hence the pressure drop across the fixed resistance increases. Thus the pressure at a mid-point on that side of the insulator part 60 falls, allowing the insulator part 60 to move back toward the central position. The opposite situation arises on the other side of the insulator part 60 where a closing gap causes an increase in pressure dropped across the variable resistance, which in turn increases the pressure at the mid-point on that side of the insulator part 60, causing further tendency for the insulator part 60 to move back to a more central position. Accordingly, the pressurised fluid system allows the running gap between the rotor 50 and stator 30 to be kept as small as possible, thus providing the maximum force/torque for a given applied voltage.

The choice of pressurised fluid is an important material choice since it is effectively forms one of the layers of the capacitor dielectric zone.

In one embodiment, the pressurised fluid may be a high dielectric lubricant. Several candidate materials are available for high dielectric lubricants and some suitable materials are water and methanol.

Advantageous attributes for the pressurised fluid include: electrical insulator—high dielectric strength; low viscosity; high dielectric constant; good lubricity; and adequately wide temperature range.

Deionised water provides all but the last of the above attributes since it has a freezing point of around 0 degrees Celsius. Methanol removes this issue at the price of a lower (but still adequate at 34 versus water at 80) dielectric constant and an intrinsically higher risk of combustion. It does however additionally provide for a lower viscosity, being around 60% to 70% that of water.

In another embodiment, the pressurised fluid is an ionisable fluid (e.g. ionisable gas such as air or a noble gas) and the voltage across opposing pairs of first and second conductor sub-regions 38A, 39A is configured in a first (activation) mode to develop an electric field sufficient to ionise a localised region of fluid between the first and second conductor sub-regions (e.g. by stressing the fluid in the localised region fluid beyond its dielectric limit to generate a plasma). Once ionised, the machine operates in a second (sustain) mode to sustain ionisation of the fluid between the conductor sub-regions 38A, 39A and the fluid will act as conductor allowing an electrical connection to be created between the high permittivity region 70 and each of conductor sub-regions 38A, 39A. Advantageously, the effect of this conduction path is to reduce (and potentially eliminate) the dielectric impact of the fluid which acts to reduce the force potential of the machine in proportion to the difference between the dielectric constants of the high permittivity region 70 and fluid. By generating a conductive fluid region between the activated conductor sub-regions 38A, 39A, a substantial increase in mechanical clearance may be achieved between the moving and static parts thereby simplifying manufacture and reducing the precision and cost of parts. This increase in mechanical clearances can be realised whilst achieving maximum (or near maximum) force output from the machine. Since the conductive fluid region may be generated using a gas, viscous drag and other fluid dynamic losses and impact such as erosion and cavitation may advantageously be kept to a low level.

The insulator part 60 may be mounted so as to allow a degree of axial displacement (i.e. in the direction of the rotational axis) for a low level of axial force, whilst having high torsional rigidity. Thus the insulator part 60 may be configured to "float" axially and take up an axial position of least resistance, e.g. at the mid-point between the first and second stator parts 34, 35.

Figures 5A, 5B:
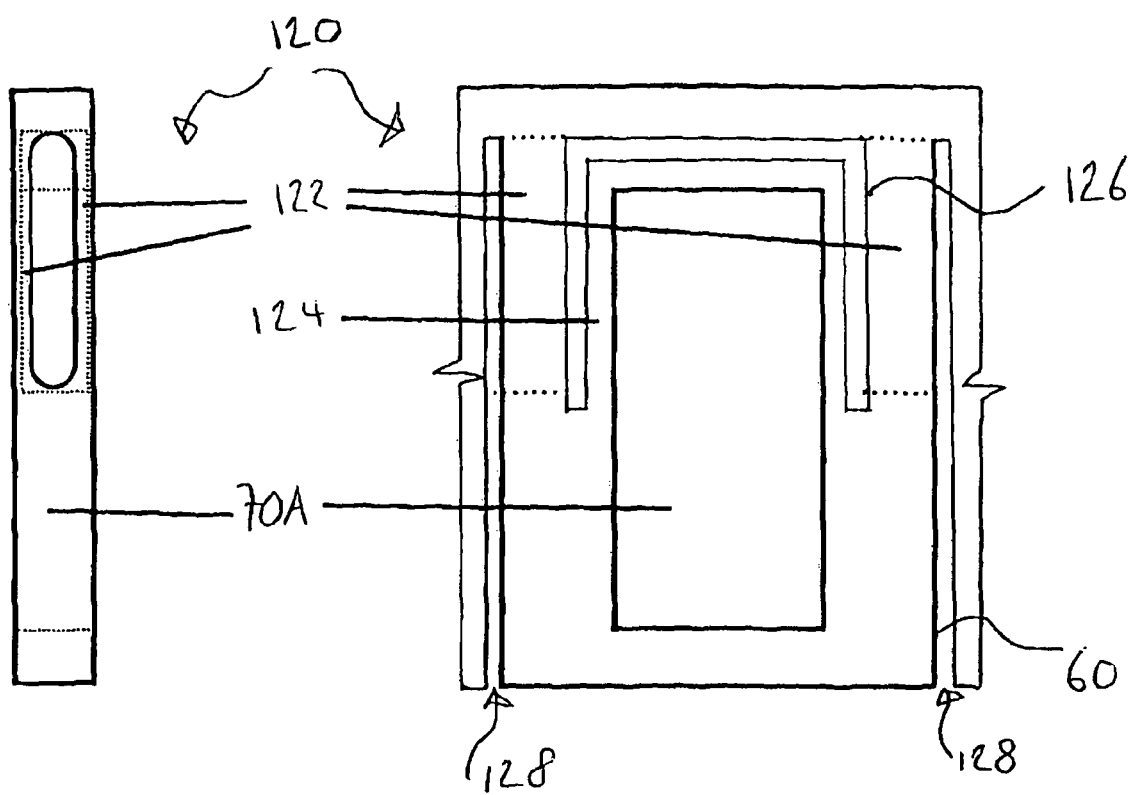
FIGS. 5A and 5B show a schematic representation of a rotor element support cradle for use in the motor machine of FIG. 1.

FIGS. 5A and 5B illustrate a proposed parallelogram form support arm system 120 for ensuring that the high permittivity parts 70 are maintained radially oriented parallel to the opposed inner faces 36, 37 of the first and second stator parts 34, 35 as the insulator part 60 moves axially (e.g. to correct any off centre position). Support arm system 120 comprises a pair of parallelogram support arms 122 together with rotor cradle section 124 formed by providing a substantially U-shaped slot 126. Slits 128 provided on opposed lateral sides of the section of rotor frame 62 bearing each high permittivity part 70 allow each high permittivity part 70 to move independently of one another (i.e. each high permittivity part 70 has its own support arm system 120). Maintaining movement parallel to the stator parts 34, 35 allows a consistent pressure balance and reduced risk of local points of wear.

Thus with the combination of some or all of the above measures it is possible to allow the running clearance to be as low as zero and typically much less than 0.5 mm. For example, the maximum running gap may be as low as 0.1 mm or even as low as 0.001 mm.

It is of course also desirable to arrange for the various components to have closely similar coefficients of thermal expansion so that thermal growth differences contribute as small amount as possible to variations in the running clearances.

To further minimise pumping and viscous drag losses beyond that resulting from the use of low viscosity fluid, it is desirable to have the first and second stator parts and insulator parts smooth and flat. For the first and second stator parts provided with conductor regions, one method of manufacture is the use of printed circuit board manufacturing techniques. In this or other methods, it is desirable to have the final finish to be flat and smooth and so this could require the filling in of the shallow recesses created by the etch process of metal removal when creating the conductor regions from a conductor layer.

For long life reliability it is desirable that the attachment of the conductor regions to the first and second stator parts be strong and durable. This can be achieved, for example by electroplating, vapour deposition, sputtering, high impact metal deposition blasting, high strength adhesives etc. Aluminium and Titanium are good materials as contenders for the conductor regions since both have the intrinsic attribute of being able to accept a very hard ceramic coating via some form of electrochemical process. However as previously discussed there is also the prospect of using a diamond-like carbon coating which can be applied to many substrate materials both conductive and non conductive.

In the case of a diamond-like carbon coating, depending upon the low friction properties of the coating it is conceivable that the stator 30 and rotor 50 may in an extreme example operate with zero clearance (i.e. with the stator 30 and rotor 50 being continuously in contact). In this way correct orientation of the rotor relative to the stator may be maintained without the use of any additional orientation techniques.

For the insulator part construction the high permittivity regions should be manufactured and assembled to ensure as close a match of axial thickness as can be practically realised with regard to the rotor frame. Similarly the coefficients of thermal expansion should be matched as closely as possible, although in this and the stator case it is not essential for correct operation, but none the less desirable.

Figure 6:
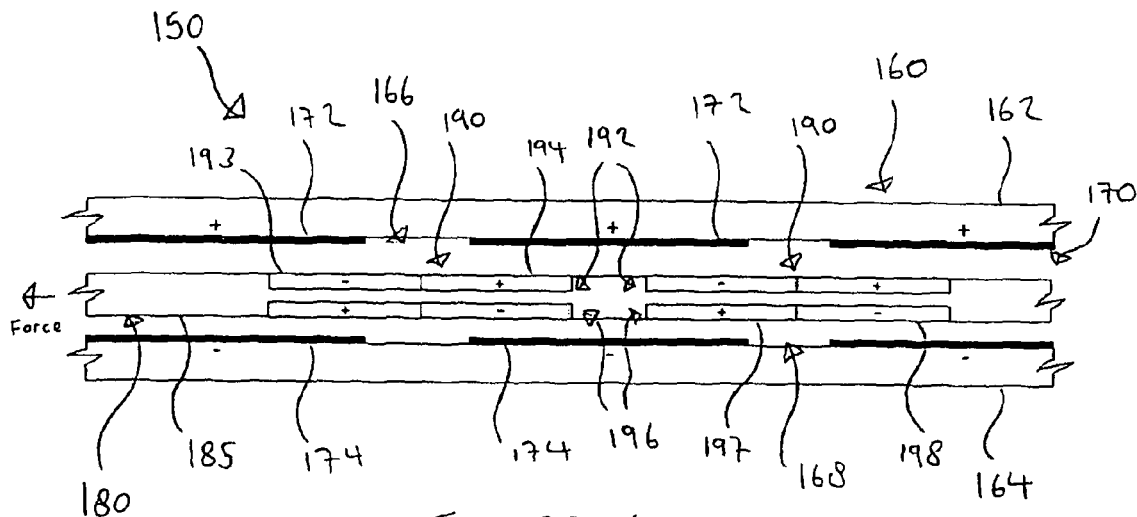
FIG. 6 shows a schematic representation of a capacitor assembly according to a second embodiment of the invention.

FIG. 6 shows an example of a capacitor assembly 150 for use in a linear or rotary machine which uses parts with differing levels of permanent electric polarisation to generate a force rather than the electrically polarisable parts used in capacitor assembly 20 of FIG. 1. Capacitor assembly 150 comprises a stator 160 comprising a pair of spaced electrically insulating plates 162, 164 defining opposed sides of a passageway 170, and a central part 180 moveable relative to the stator 160 along passageway 170. Each plate 162, 164 supports a conductor region 166, 168 comprising a plurality of spaced conductor sub-regions 172, 174 to form a plurality of capacitor regions as illustrated. Central part 180 comprises an electrically insulating body 185 housing a plurality of groups of electret pairs 190. Each electret pair 190 comprises an upper electret pair 192 comprising a leading negatively polarised electret part 193 and a trailing positively polarised electret part 194 and a lower electret pair 196 comprising a leading positively polarised electret part 197 and a trailing negatively polarised electret part 198. When an electric field is generated between the conductor regions 166, 168 as shown, the leading electret parts 193, 197 of each group 190 of electret pairs is attracted towards their nearest (oppositely charged) conductor sub-region. At the same time, the trailing electret parts 194, 198 are repelled by their nearest (similarly charged) conductor sub-region to give a push-pull effect.

Figure 7:
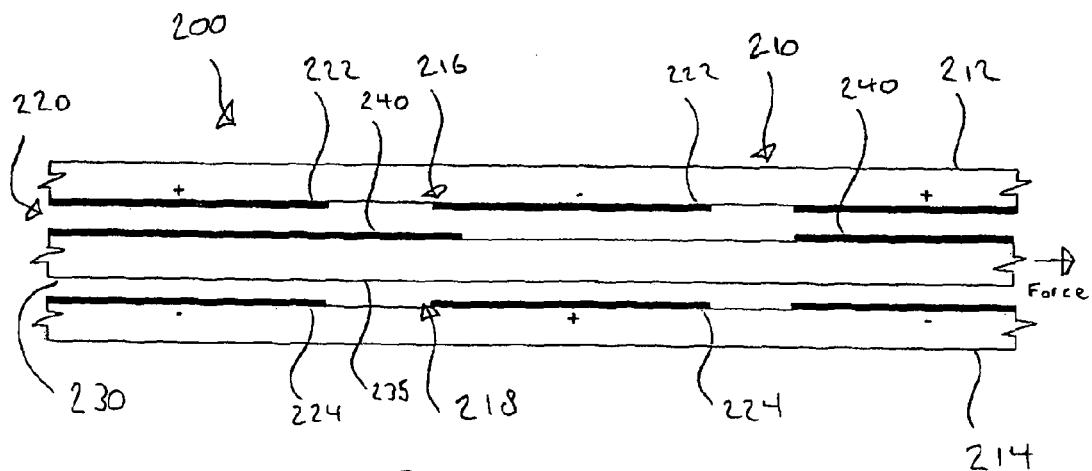
FIG. 7 shows a schematic representation of a capacitor assembly according to a further embodiment of the invention.

FIG. 7 shows an example of a further capacitor assembly 200 for use in a linear or rotary machine which uses a polarisable conductor to generate a force rather than the electrically polarisable dielectric parts used in capacitor assembly 20 of FIG. 1 or the electret parts of the capacitor assembly 150 of FIG. 6. Capacitor assembly 200 comprises a stator 210 comprising a pair of spaced electrically insulating plates 212, 214 defining opposed sides of a passageway 220, and a central part 230 moveable relative to the stator 210 along passageway 220. Each plate 212, 214 supports a conductor region 216, 218 comprising a plurality of spaced conductor sub-regions 222, 224 to form a plurality of capacitor regions of alternating polarity as illustrated. Central part 230 comprises an electrically insulating body 235 supporting a plurality of spaced conductor plates 240. When an electric field is generated between the conductor regions 216, 218 as shown, leading and trailing ends of each conductor plate 240 become oppositely polarised by the local electric field resulting in a force being generated on the central part 230 along passageway 220.

Figure 8A:
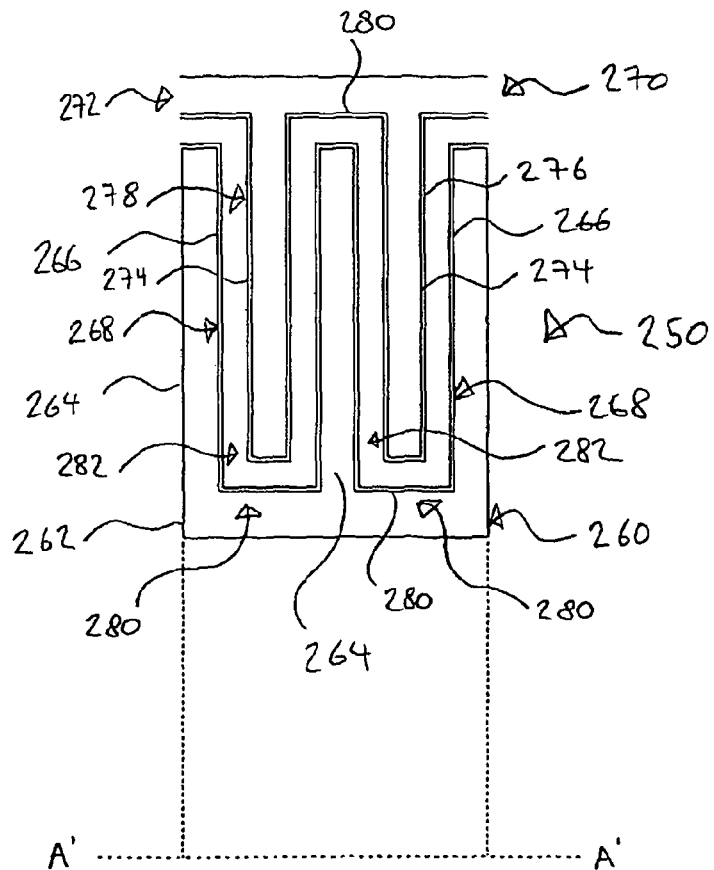
FIG. 8A shows a schematic cross-sectional view of a machine according to another embodiment of the present invention.
Figure 8B:
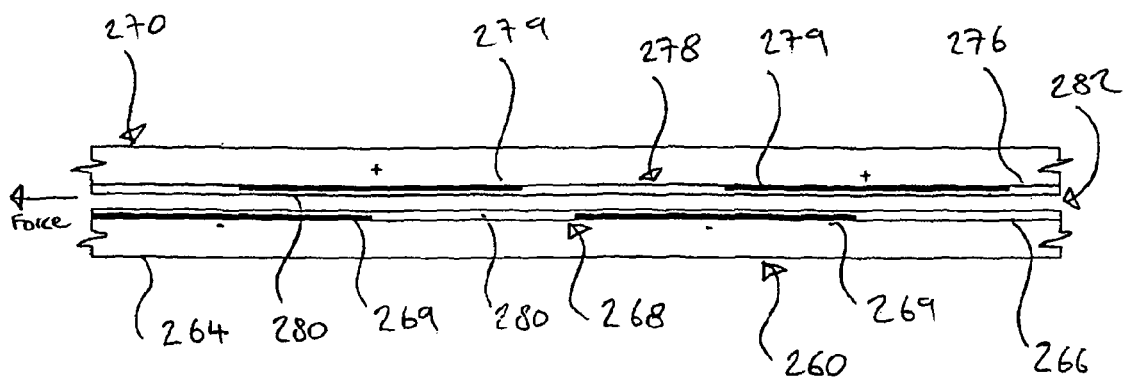
FIG. 8B shows a schematic representation of a capacitor assembly of the machine of FIG. 8A.

FIGS. 8A and 8B show details of an example of a further rotary machine 250 comprising a stator 260 and a rotor 270 rotatably mounted around the stator 260 about a central axis of rotation "A'" extending through the centre of stator 260. Stator 260 and rotor 270 together form a plurality of capacitor assemblies 280 spaced along the axis of rotation "A'" each capacitor assembly 280 being associated with a passageway 282. Stator 260 comprises an annular stator body 262 and a plurality of electrically insulating stator parts 264 extending radially from the stator body 262, each stator part 264 comprising a first annular surface 266 supporting a first conductor region 268 comprising a plurality of discrete circumferentially spaced first conductor sub-regions 269. Rotor 270 comprises an annular rotor body 272 and a plurality of electrically insulating rotor parts 274 extending radially from the rotor boy 272 between adjacent pairs of stator parts 264, each rotor part 274 comprising a second annular surface 276 supporting a second conductor region 278 comprising a plurality of discrete circumferentially spaced second conductor sub-regions 279. Stator 260 and rotor 270 each further comprise a dielectric insulator layer 280 covering exposed surfaces of the first and second conductor sub-regions 269, 279. When an electric field is generated between circumferentially offset conductor sub-regions 269, 279 as shown, attraction between sub-region pairs 269, 279 results in generation of a torque.

FIGS. 9A-9I show a machine 310 (and parts thereof) based on the principles of machine 10 described above for mounting in the hub space of a vehicle wheel.

Machine 310 comprises a stator 330 and a rotor 350 rotatably mounted around the stator 330. In use, rotor 350 is configured to follow a circular path about a central axis of rotation "A''" extending through the centre of stator 330. As described in more detail below, a fluid (air) bearing system 400 supports rotor 350 during rotation about the stator 330 whilst maintaining clearance between rotor 350 and stator 330.

Stator 330 comprises an annular stator body 332, first and second end walls 333 extending radially from the stator body 332, first and second end stator parts 334 extending radially from the stator body 332, a plurality of inner stator parts 335A, 335B extending radially from the stator body 332 between the first and second end stator parts 334 to form a plurality of passageways 340, and a plurality of substantially annular spacer parts 341 extending radially from the stator body 332 into a lower portion of passageways 340, each annular spacer part 341 having a radially outermost surface defining a protuberant ridge 342 extending circumferentially around each spacer part 341 and having a curved, tapered cross-sectional profile. First and second end stator parts 334 each comprise an electrically insulating body 336A defining an annular surface 336B supporting a ground plane end conductor region 338 for providing electrical screening to the apparatus. Each of the inner stator parts 335A comprises an electrically insulating body 337A defining a pair of opposed annular surfaces 337B supporting a pair of phase addressable inner conductor regions 339A and each of the inner stator parts 335B similarly comprises an electrically insulating body 337A defining a pair of opposed annular surfaces 337B supporting a pair of ground plane inner conductor regions 339B. In addition, each of the inner stator parts 335A,335B further comprises a radially outermost surface defining a protuberant ridge 343 extending circumferentially around the stator part and having a straight tapered cross-sectional profile. Although inner stator parts 335A, 335B are shown as comprising pairs of axially adjacent plates these parts may equally comprise single plates supporting inner conductor regions 339A, 339B on opposed sides thereof.

Phase addressable inner conductor regions 339A of inner stator parts 335A each comprise a plurality of discrete conductor sub-regions 345 connected in pairs by a plurality of circumferentially extending connectors 346 to form three individually addressable phase groups 345A, 345B, 345C, with conductor sub-regions 345 being circumferentially spaced evenly along the circular path around rotational axis "A". End conductor regions 338 and inner conductor regions 339B each comprise a plurality of discrete conductor sub-regions 347 registered with conductor sub-regions 345 and pairs of conductor sub-regions 347 are connected in pairs by connectors 348 to form a single ground plane. Each of conductor sub-regions 345, 347 have a substantially trapezoidal profile in the plane of annular surfaces 336B, 337B respectively and include rounded corners in order to minimise risk of corona discharge. Conductor sub-regions 345, 347 are raised relative to annular surfaces 336B, 337B and together with raised insulator regions 349A form recesses 349B extending approximately half the length of conductor sub-regions 345, 347 between each adjacent pair of conductor sub-regions 345, 347 in each stator part. Raised insulator regions 349A may be formed by ceramic coating material added at the same as a ceramic coating (e.g. titanium oxide coating or similar) Is applied to conductor sub-regions 345, 347 during manufacture of the stator parts 334, 335A, 335B.

Rotor 350 comprises an annular rotor body 352 and a plurality of spaced insulator parts 360 extending from the rotor body 352 into passageways 340. Annular body 352 comprises an inner edge 365 defining a plurality of axially spaced circumferential recesses 366 each having a straight tapered cross-sectional profile for receiving protuberant ridge 343 extending circumferentially around each inner stator part 335A, 335B. Insulator parts 360 each comprise a substantially annular low permittivity rotor frame 362 defining a plurality of evenly circumferentially spaced apertures 364 each housing a high permittivity region 370 to form circumferentially alternate sections of high and low permittivity uniformly distributed around the central axis of rotation "A". Each insulator part 360 includes a radially innermost edge 367 defining a circumferential recess 368 of substantially parabolic cross-section for receiving protuberant ridge 342 extending circumferentially around each spacer part 341 of stator 330.

Insulator parts 360 each further comprise a parallelogram form support arm system 420 for ensuring that the high permittivity parts 370 are maintained radially oriented parallel to the opposed inner faces 336, 337 of the stator parts as the insulator part 360 moves axially to correct any off centre position. Support arm system 420 comprises a pair of parallelogram support arms 422 together with rotor cradle section 424 formed by providing a substantially U-shaped slot 426. Slits 428 provided on opposed lateral sides of the section of rotor frame 362 bearing each high permittivity part 370 allow each high permittivity part 370 to move independently of one another.

Stator parts 334, 335A, 335B are aligned axially so that when an activation voltage is applied across the series of stator parts of machine 310, the net axial force acting on the inner stator parts 335A, 335B is substantially zero. The total axial force is therefore imposed upon the two end stator parts 334, which have no balancing stator part on their outer sides. These end stator parts 334 in combination with first and second end walls 333 are therefore constructed with substantial mechanical rigidity in the axial direction in order to better resist this attractive force. The inner stator parts 335A, 335B therefore need only be of such proportions to resist any forces resulting from the imperfections of the manufacturing process or unbalanced thermal growth. Accordingly, the inner stator parts 335A, 335B should be adequately substantial so that they can, with tolerable levels of strain, withstand the stress resulting from component and assembly tolerance.

Figure 9A:
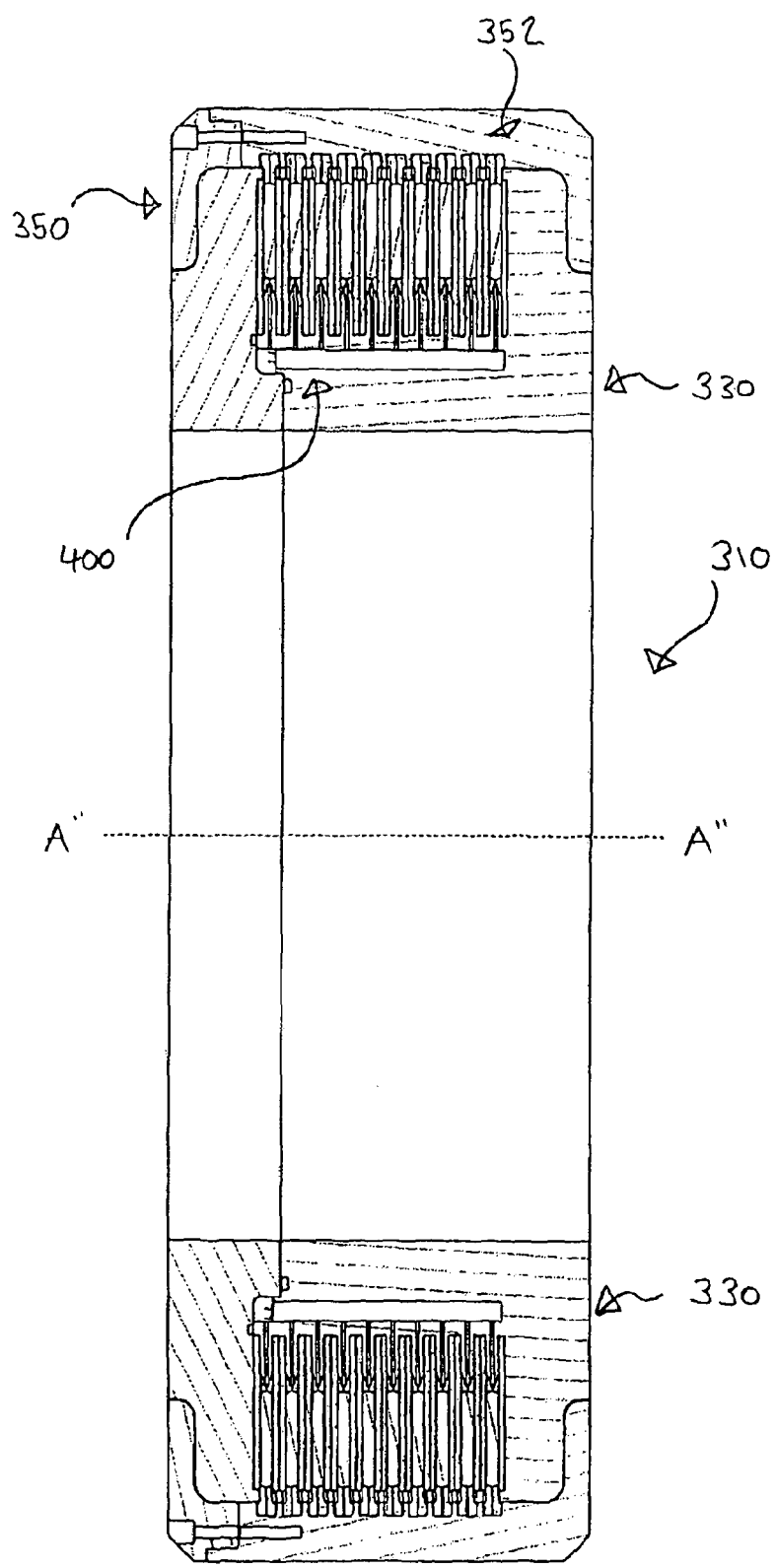
FIG. 9A shows a schematic cross-sectional view of a machine according to another embodiment of the present invention.
Figure 9B:
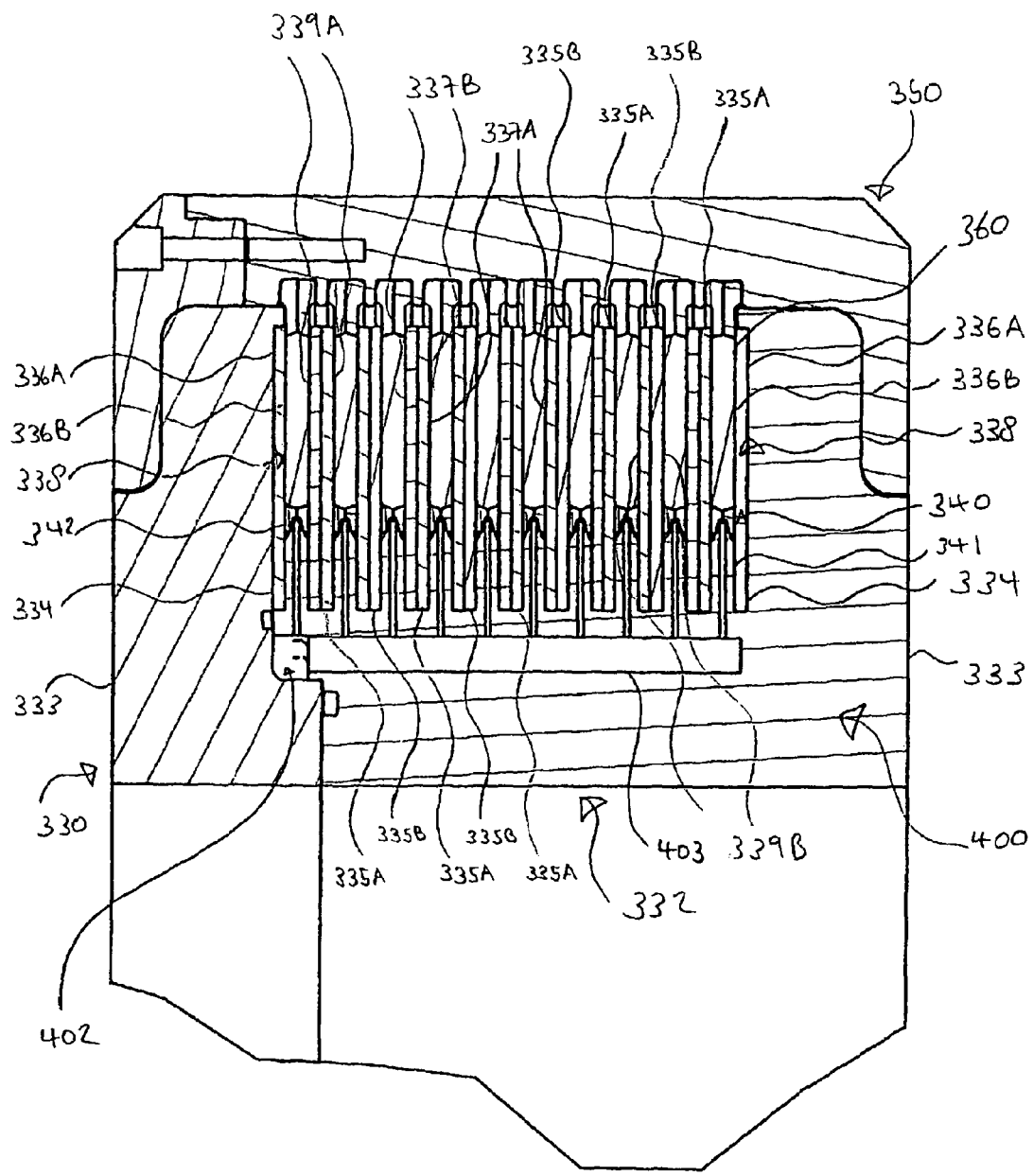
FIGS. 9B-9I show details of the machine of FIG. 9A.
Figure 9C:
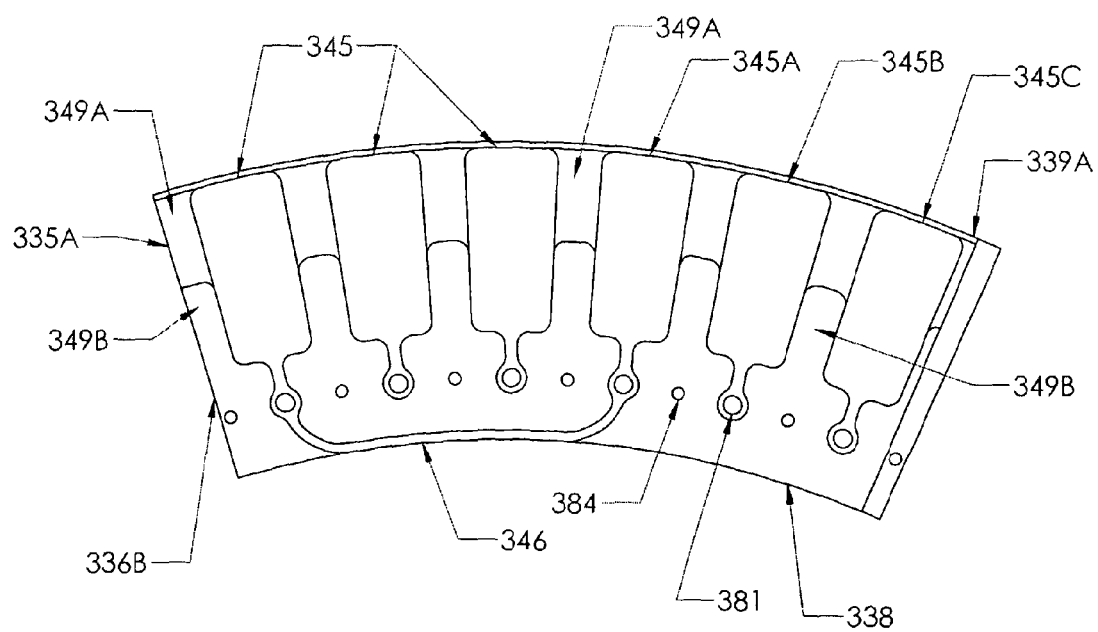
Figure 9D:
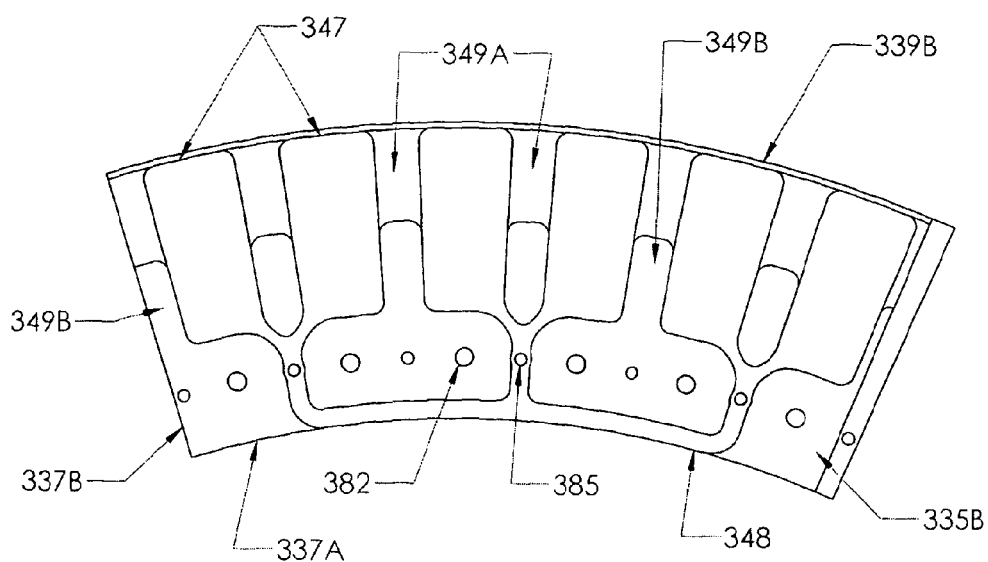
Figure 9E:
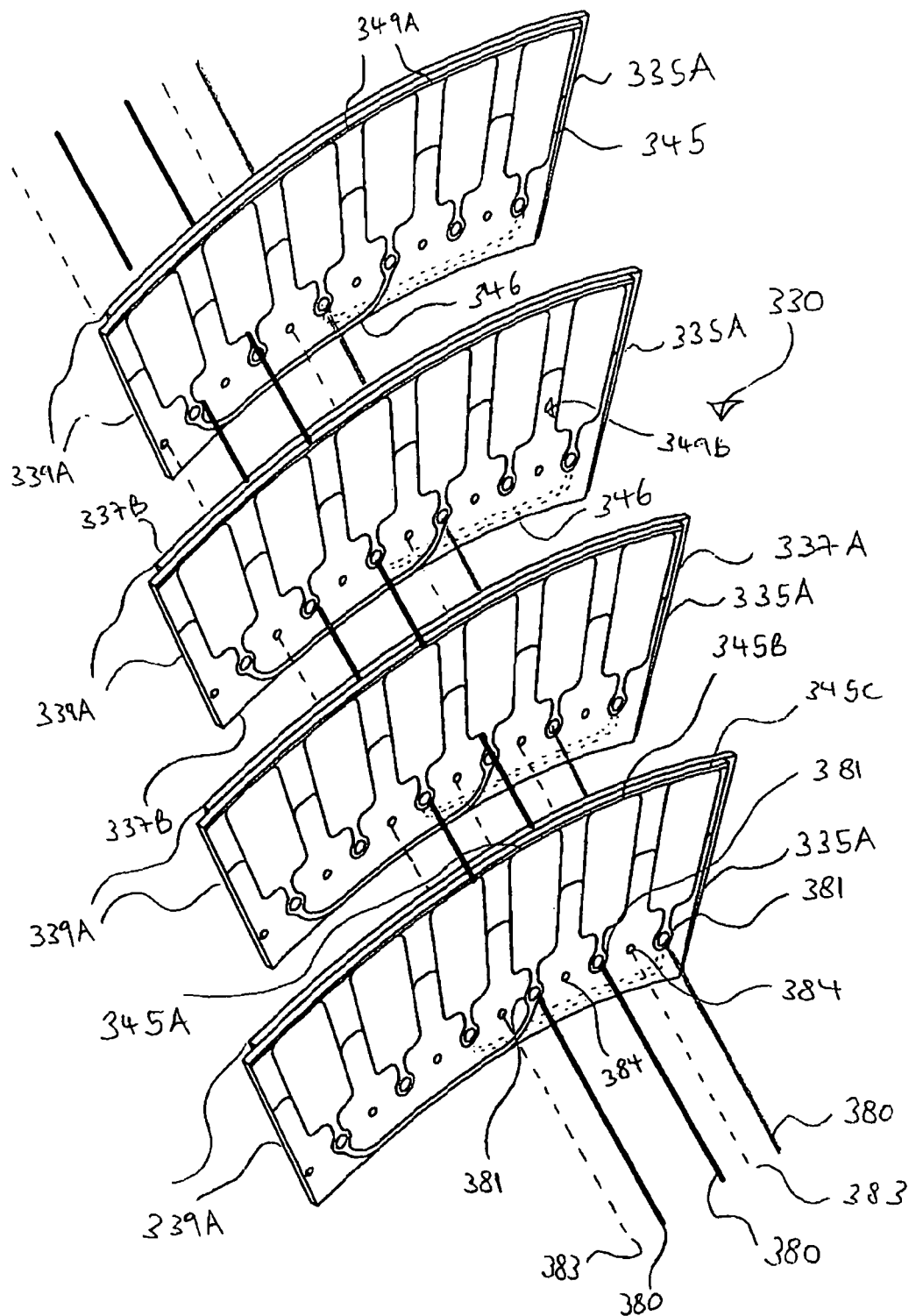
Figure 9F:
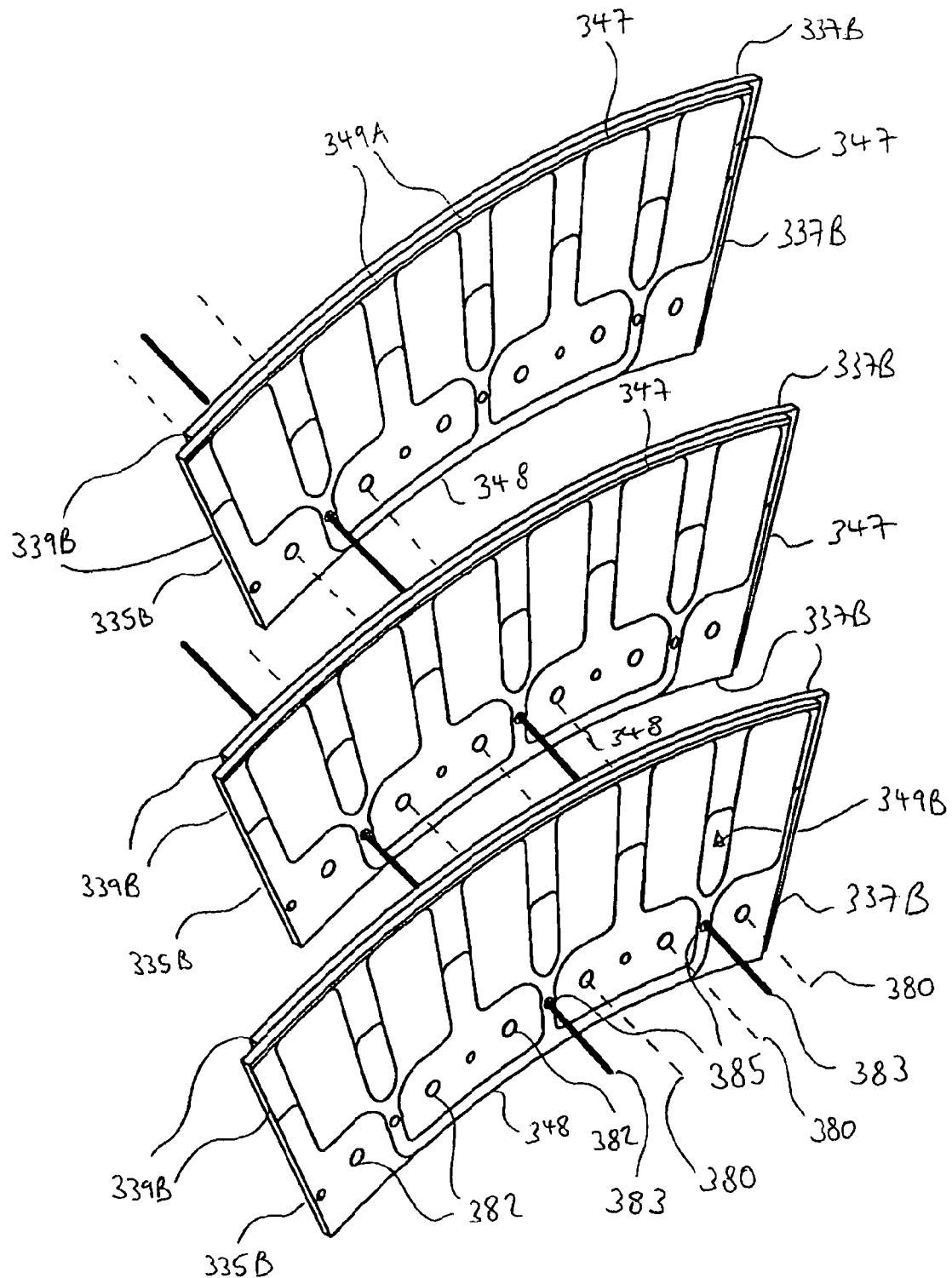
Figure 9G:
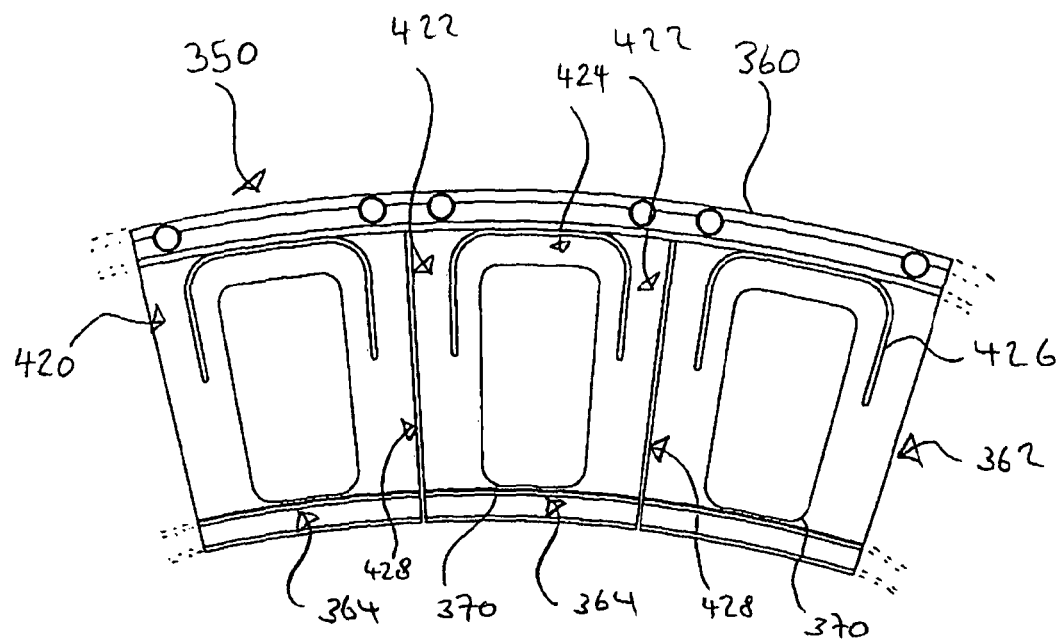

Insulator parts 360 and stator parts 334, 335A, 335B are each formed from a series of nine arcuate segments fitted together to form a series of annular components. In this way, issues associated with thermal expansion and contraction of large diameter annular form components may be avoided or at least reduced. In addition, segmenting these annular components makes it more practical to produce the parts with very fine tolerances since it is generally easier to handle and process precisely a small part than a large ring. This is especially the case when the parts are constructed using ceramic materials. It should be noted that segment edges of each arcuate segment are arranged to be non-radial in order to provide for a smooth transition as the insulator parts 360 move past the stator parts 334, 335A, 335B with a progressive transition of edges between them. If this were not the case, each insulator part 360 would encounter the stator segment edge as a single event making it more likely that undesirable interference could occur. As illustrated in FIGS. 9E and 9F, each arcuate segment is staggered from one stator part to the next in the assembled machine.

As illustrated in FIGS. 9E and 9F, the three phase groups 345A, 345B, 345C on inner conductor regions 339A are addressable using a plurality of circumferentially spaced, torque transmitting, electrical connector pins 380 extending axially through apertures 381 located in inner stator parts 335A and apertures 382 located in inner stator parts 335B. Circumferentially extending connectors 346 extend across each side of stator parts 335A in order to connect pairs of conductor sub-regions in each phase. Inner conductor regions 339B located on opposed faces of inner stator parts 335B are connected by a plurality of circumferentially spaced, torque transmitting electrical connector pins 383 which extend axially through apertures 385 located in inner stator parts 335B and apertures 384 located in inner stator parts 335A to form a pair of ground planes in each stator part 335B.

Each stator part 334, 335A, 335B is staggered relative to the previous stator part as illustrated so that all three phase groups 345A, 345B, 345C and all pairs of conductor sub-regions 347 are connected to an activation voltage source (not shown) via connectors 346, 348 circumferentially and conductive pins 380, 383 axially. As illustrated, inner stator parts 335B are staggered a different pitch compared to the phase conductive inner stator parts 335A, with the latter parts being staggered by one phase pitch (i.e. by one conductive sub-region 345) whilst inner stator parts 335B are staggered by three pitches (i.e. with inner stator parts 335B being connected axially by pins 383 extending though alternate apertures 385). The degree of stagger is related to the relative number of conductive sub regions and thus this is not any absolute number but a number related to the choice of the number of sub regions.

Figure 9H:
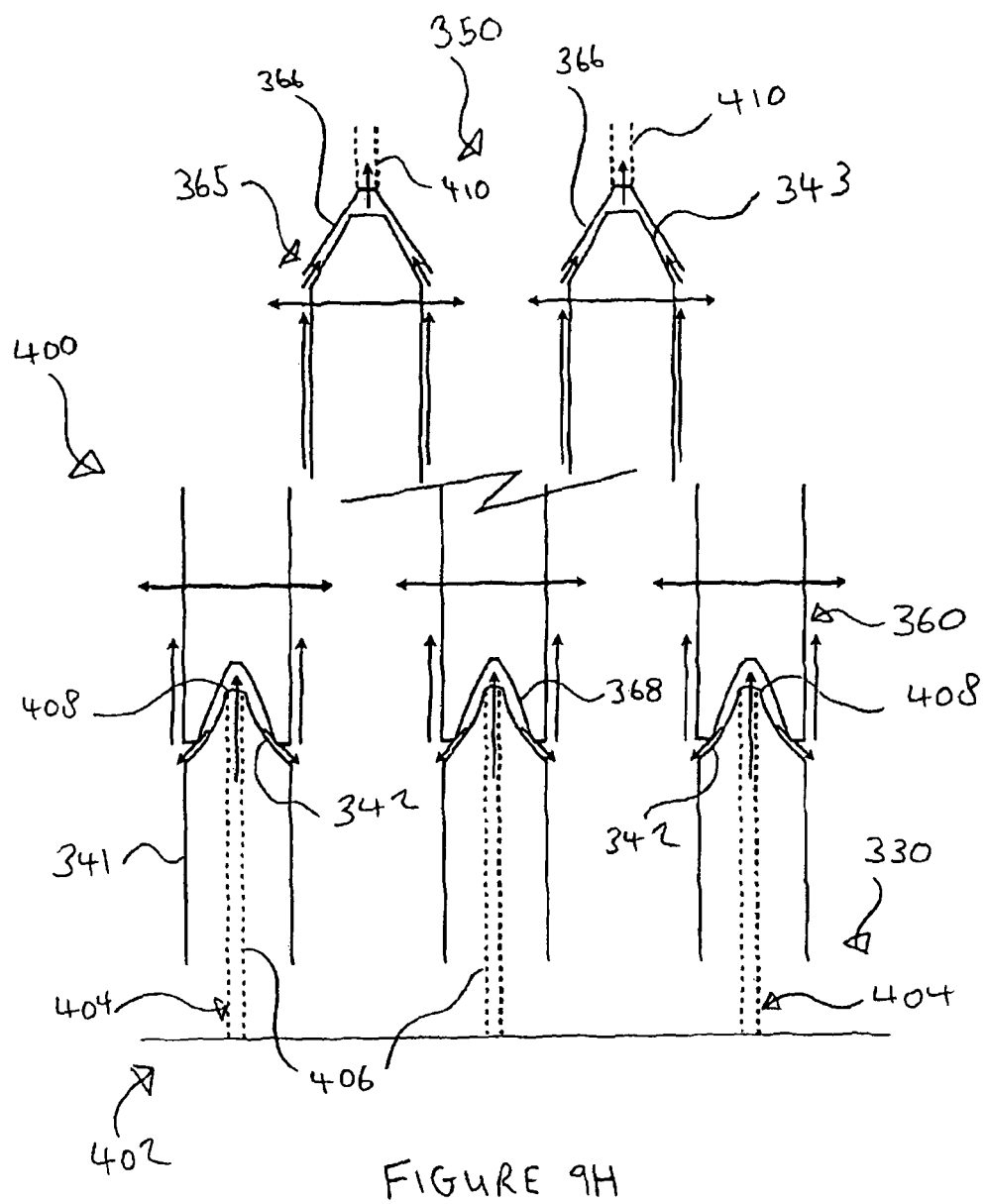
Figure 9I:
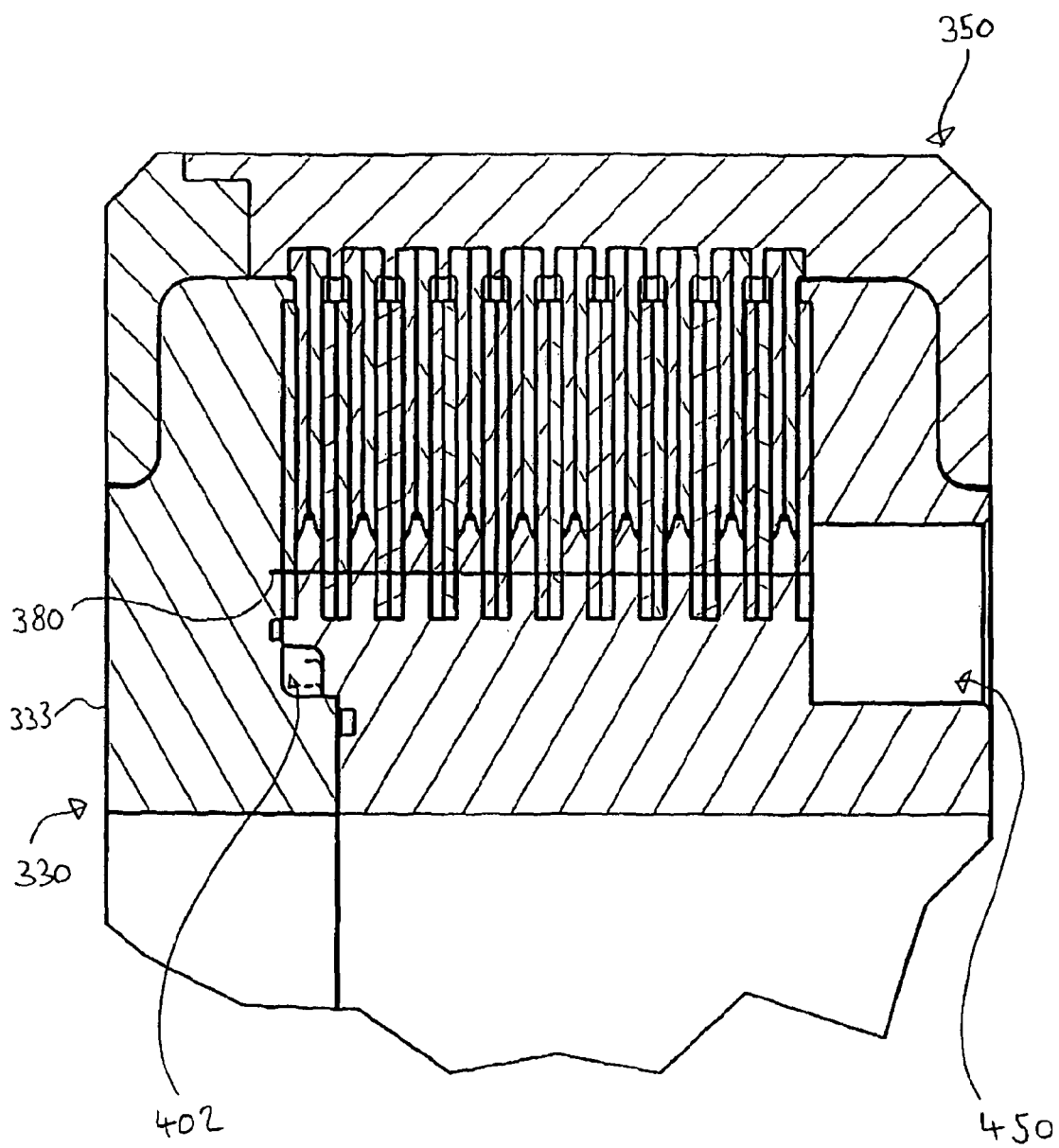

As shown in FIG. 9I, connector pins 380 (and 383) extend through stator parts 334, 335A, 335B, and the plurality of substantially annular spacer parts 341 extending radially from the stator body 332, into first end wall 333. In this way, torque experienced by stator parts 334, 335A, 335B is distributed through stator 330. Connector pins 380, 383 are connected to control means (not shown) via access aperture 450.

Fluid (Air) bearing system 400 exclusively supports rotor 350 during rotation about stator 330 whilst maintaining axial clearance between rotor 350 and stator 330. As shown in FIG. 9H, fluid bearing system 400 comprises a circumferential chamber 402 connected to a pressurised air source (not shown), the circumferential chamber 402 being in fluid communication with a plurality of circumferentially spaced bores 403 (one bore 403 for each circumferential conductive sub-region position) each extending axially through annular stator body 332 to supply fluid to a plurality of axially spaced pressurised fluid channels 404 extending radially through each annular spacer part 341 located between adjacent stator parts 334, 335A, 335B. Each pressurised fluid channel 404 comprises a passageway 406 configured to provide a predetermined pressure drop as air passes therethrough and an outlet 408 located at a radially outermost point on protuberant ridge 342. Outlets 408 are positioned next to each pair of opposing conductor sub-regions 345, 347 in each passageway 340 in order to apply pressurised air close to the active elements in the machine. Air exits passageways 340 through a plurality of circumferentially spaced fluid outlet channels 410 located in circumferential recess 366 in rotor 350 and is vented to atmosphere. Recesses 349B formed in each stator part 334, 335A, 335B provide a space which is large relative to clearance between conductor sub-regions 345, 347 and each adjacent insulator part 360 and acts to accumulate pressurised air close to air exit passageways 340 before air leaks between conductor sub-regions 345, 347 and insulator part 360. In this way pressure loss caused by the narrow clearance between conductor sub-regions 345, 347 and each adjacent insulator part 360 is advantageously minimised. The staggered arrangement of stator parts 334, 335A, 335B provides a substantial degree of pressure isolation across the faces of the stator parts helping to prevent immediate leakage of pressure through the stator parts.

As air enters each passageway 340 from annular spacer parts 341 it is directed by the concave shape of circumferential recess 368 of insulator part 360 to flow in opposed axial directions. If a force moves insulator part 360 axially then this has the effect of directing the air flow to the axial side that opposes the force and starving the side that assists the force, thereby re-establishing an equilibrium and mid-position state. Similarly, as the air leaves each passageway 340 it is directed past protuberant ridge 343 extending circumferentially around stator parts 335A, 335B to fluid outlet channels 410 located midway between each adjacent pair of insulator parts 360. If a force causes stator part 335A, 335B to be off-centre with respect to insulator parts 360 then the flow of air is choked on the axial side that the stator part 335A, 335B has moved closer to the insulator part 360 and is eased on the other axial side. Where the flow is choked, there is a pressure build up that opposed the movement and on the other side the pressure reduces thereby providing a stabilising servo effect that tends to maintain a mid-position of equilibrium.

The benefits of using air bearing system 400 are:
virtually frictionless rotation;
low friction, drag and pumping losses in the machine;
potentially extended lifetime for seals;
lighter machine absent of mechanical bearing;
silent or near silent rotation;
with ceramic coated/formed parts, the machine can function with low or even no pressure, albeit with loss of torque due to additional losses;
it removes the necessity for a central motor section allowing provision of a central zone that will remain static as the vehicle moves and which can be used for structural purposes
no wearing parts
at higher rotation speeds, the pumping action of the machine rotation can be used to provide all or some of the bearing air flow requirement and to reduce the pressure source pump energy needs.

Figure 10A:
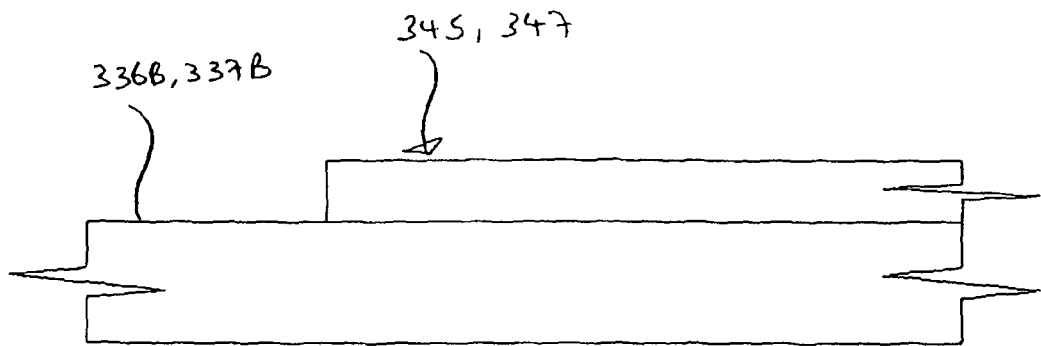
FIGS. 10A and 10B show further details of the machine of FIG. 9A.
Figure 10B:
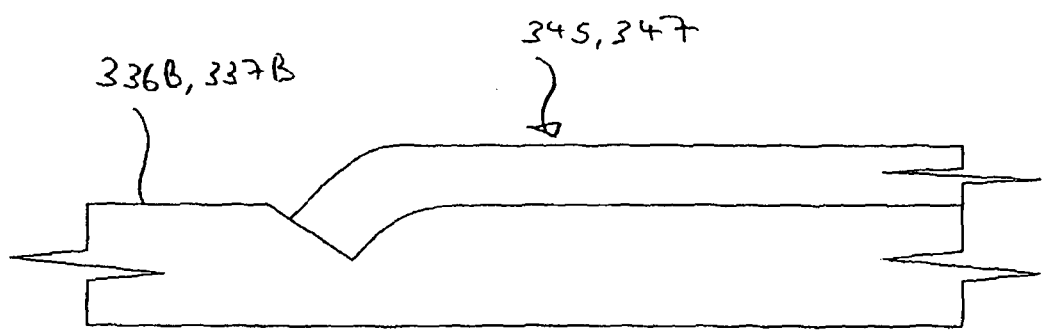

With reference to FIGS. 10A and 10B, corona discharge is acknowledged to be one of the major causes of failure in high voltage systems. In addition to providing conductor sub-regions 345, 347 with rounded corners as discussed above, the risk of failure due to corona discharge may be further minimised by submerging peripheral edges of conductor sub-regions 345, 347 into annular surfaces 336B, 337B as illustrated in FIG. 10B to create a "lost edge" profile. In addition, the following provisions may help to inhibit corona discharge: presence of ceramic coating to all conductor surfaces; the interposing of rotor insulator parts 360; provision of adequately large circumferential spacing between conductor sub-regions 345, 347; and the presence of an insulating fluid in the running clearance between the rotor 350 and stator 330.

Figure 11:
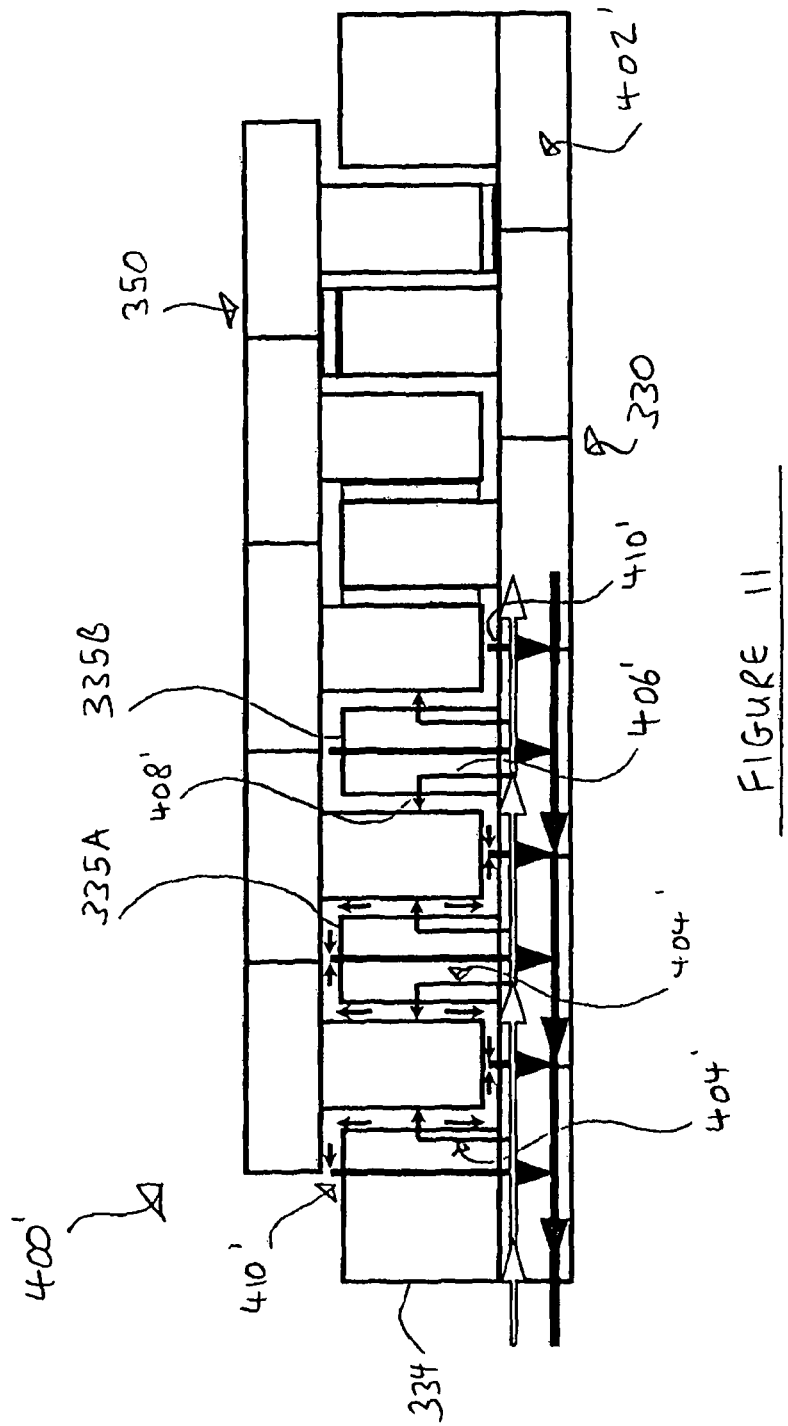

FIGS. 11 and 12 show examples of other fluid bearing system 400', 400" for use with machine 310. In fluid bearing system 400', pressured gas (e.g. air, or a gas with a dielectric constant greater than 1 such as carbon dioxide) is supplied from a pressured fluid source (not shown) to circumferential chamber 402' in fluid communication with a plurality of circumferentially spaced pressurised fluid chambers 404' extending through stator parts 334, 335A, 335B. Each pressurised fluid channel 404' comprises a passageway 406' configured to provide a predetermined pressure drop as fluid passes therethrough and an outlet 408' in annular surface 336B, 337B between each adjacent conductor sub-region 345, 347 pairing for applying fluid pressure at a plurality of circumferentially spaced regions on opposed sides of each insulator part 360. Fluid then flows radially inwards and outwards through the running gap between stator parts 334, 335A, 335B and insulator parts 360 and returns to circumferential chamber 402' via return channels 410' located along radial end faces of the stator parts 334, 335A, 335B and annular stator body 332.

The grey regions shown in FIG. 11 illustrate areas of radial and axial pressure. Thus, the radial bearing effect is produced as s result of pressure between the outer diameter face of stator parts 334, 335A, 335B and the opposing face of rotor 350 and pressure between the inner diameter face of insulator parts 360 and the opposing face of stator 330. The axial bearing effect is produced as a result of pressure between the radial opposed faces of insulator parts 360 and stator parts 334, 335A, 335B. The axial force resulting from the pressure of the fluid acts both to counteract any electrostatic attractive force resulting from any offset of the insulator parts 360 in the running gap as well as an axial thrust bearing counteracting an axial force induced by external effects that attempt to move rotor 350 axially relative to stator 330.

The configuration and dimensions of passageways passageway 406' are important in providing a stable and self-correcting system. This is achieved by ensuring a pressure drop precedes the active bearing zone. For example, if an external radial force is imparted, for example the mass of the vehicle in the case of a vehicle wheel, the fluid system must adjust pressures automatically so as to compensate for the asymmetric force. This is achieved by ensuring a pressure drop passageway precedes the active area producing the radial force. Prior to any disturbing force, the system is in equilibrium with pressures and clearances symmetrical. When a force causes rotor 330 to move radially, closing the radial running clearance on one side of the machine, whilst increasing the clearance on the opposite side of the machine, the effect is to increase the back pressure on one side of the machine and reduce the back pressure on the other side. The side with increased back pressure and reduced running clearances causes the flow in that area to reduce as a result of the reduced active passageway. This reduced flow causes less pressure drop over the preceding pressure drop passageway which provides for an increase pressure to be available at the active zone, thus exerting more force to counteract the disturbance.

In order for the fluid system to function as a main bearing rotor 330 should have limited scope for axial displacement within itself. For example, insulator parts 360 may be substantially rigid axially so that a substantially stiff response can be achieved to external axial forces. It is however desirable to have a small amount of axial displacement within each in insulator part 360 as this gives the ability to locally compensate for any manufacturing/assembly tolerances inevitable in any practical machine. The degree of intrinsic axial compliance associated with each insulator part 360 needs to be no more than an amount equal to the tolerance build-up that creates a difference in the actual axial position of insulator part 360 relative to the absolute position it should occupy. Typically this will be no more than the axial running clearance. In one embodiment this will be of the order of 0.01 mm.

Fluid bearing system 400" is a modified version of fluid bearing system 400' in which stator parts 334, 335A, 335B and insulator parts 360 have mutually inclined surfaces whereby radial forces become components of the axial force experienced by rotor 350 based on the angle of taper. Features in common with system 400' are labelled accordingly. This configuration has the advantage that the elements of the machine are intrinsically stiffer and so able to withstand a great stress with less strain.

Figure 13A:
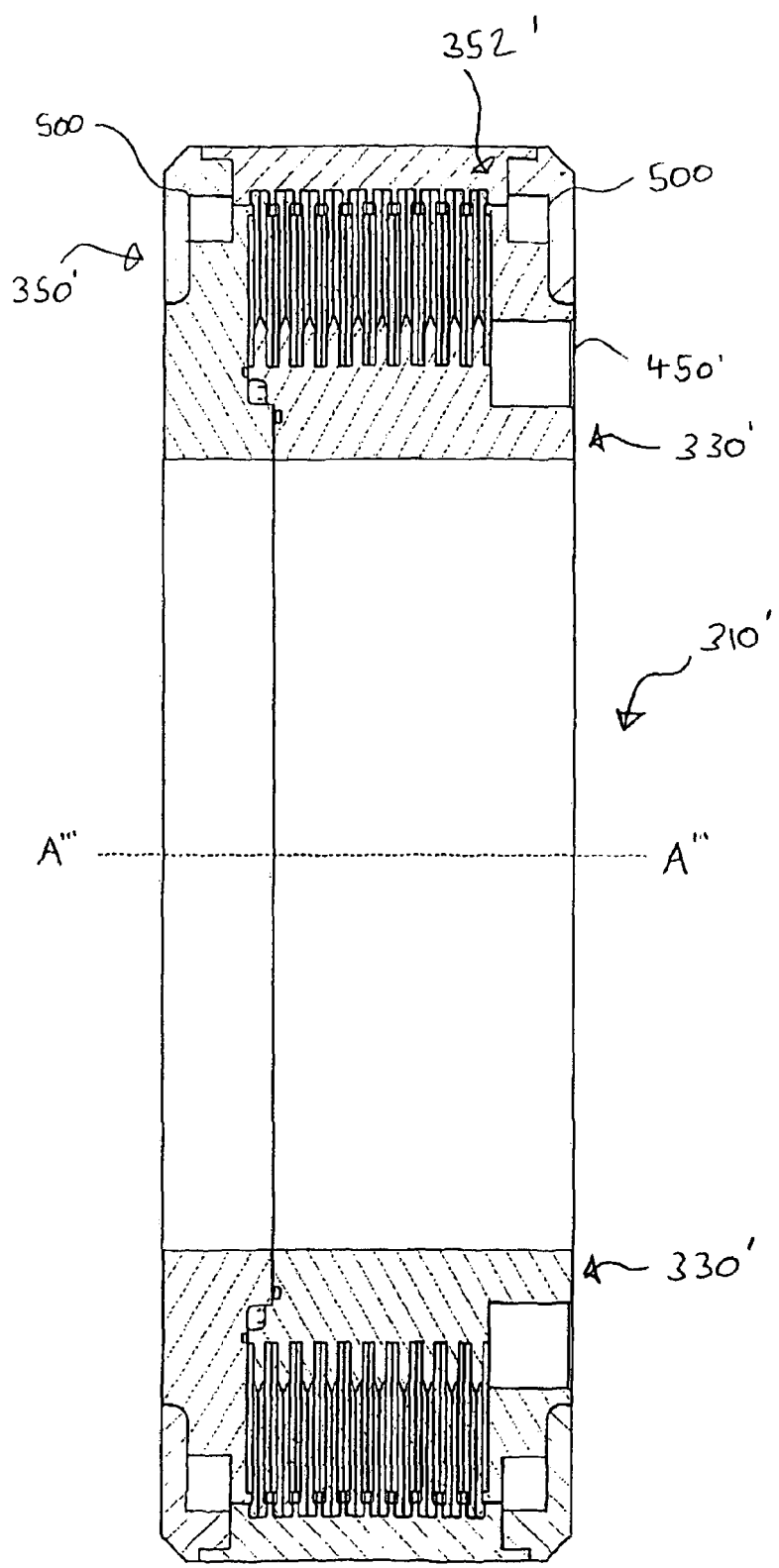
FIG. 13A shows a schematic cross-sectional view of a machine according to yet another embodiment of the present invention.
Figure 13B:
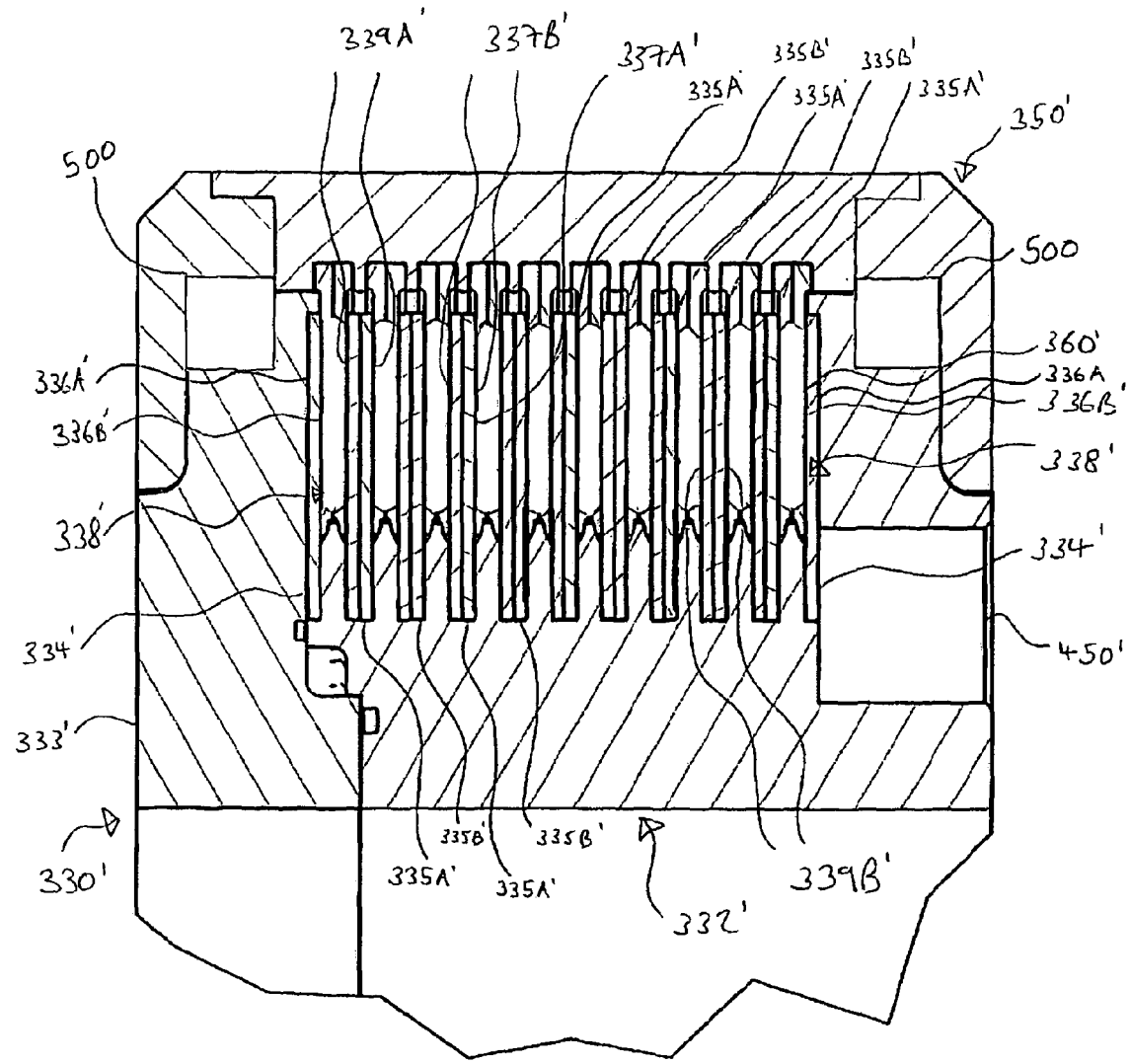
FIG. 13B shows details of the machine of FIG. 13A.

FIGS. 13A and 13B show a further machine 310' based on machine 310 but with a mechanical bearing 500 replacing the air bearing 400 of machine 310. Features in common with machine 310 have corresponding labelling. The provision of mechanical bearing 500 close to the active parts of the machine allow accurate positioning of the rotor 350' relative to the stator 330' in the region of these active parts. In addition to mechanical bearing 500, machine 310' may include a pressurised fluid system (e.g. based on the principles of pressurised fluid system 100 described above) for maintaining running clearance between rotor 350' and stator 330'.

Figure 14:
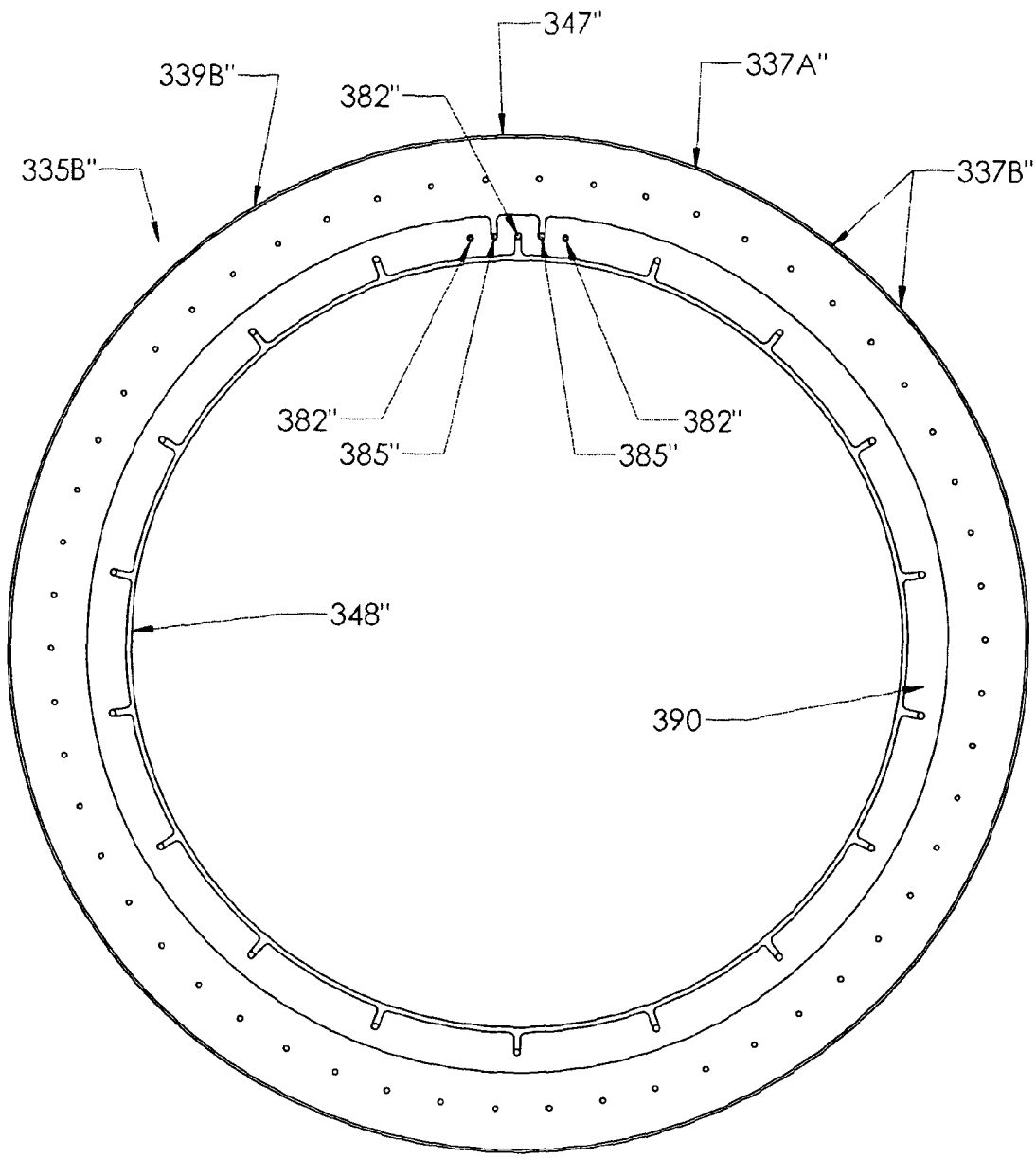
FIGS. 14-16 show schematic views of alternative parts for the machines of FIG. 9A or FIG. 13A.

FIG. 14 shows an example of another inner stator part 335A" for use with machine 310 or 310' comprising an electrically insulating body 337A" defining a pair of opposed annular surfaces 337B" each supporting an inner conductor region 339A" comprising a continuous annular conductor sub-region 347" forming a ground plane. Inner conductor region 339A" is addressable by a pair of wires (not shown) extending axially through primary apertures 384". Primary apertures 381A", 381B", 381C" allow wires addressing phase groups 345A, 345B, 345C to pass through inner stator part 335A". Inner stator part 335A" further comprises a continuous conductor track 348" which in use distributes an activation voltage to one of the three phase groups 345A, 345B, 345C in inner stator part 335B or 335B' via conductive pins (not shown) extending through secondary apertures 385". Annular conductor sub-region 347" and conductor track 348" are electrically separated by a substantially annular insulating part 390.

Figure 15:
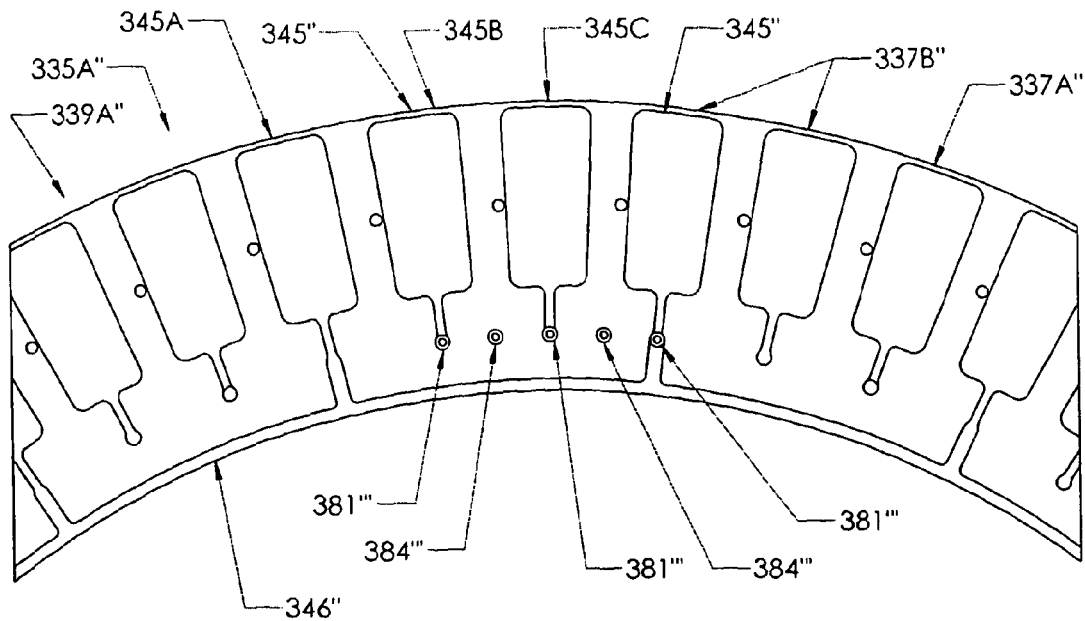

FIG. 15 shows an example of another inner stator part 335A" for use with machine 310 or 310' comprising an electrically insulating body 337A" defining a pair of opposed annular surfaces 337B" each supporting an inner conductor region 339A". Inner conductor regions 339A" each comprise a plurality of discrete conductor sub-regions 345" forming three phase groups 345A, 345B, 345C with a continuous conductor track 346" which in use distributes an activation voltage to each conductor sub-region 345" in one of the three phase groups. Apertures 381' allow connector pins (not shown) addressing phase groups 345A, 345B, 345C to pass through inner stator part 335A". Apertures 384'" allow a further set of connector pins (not shown) addressing inner stator parts 335B" to pass through inner stator part 335A".

Figure 16:
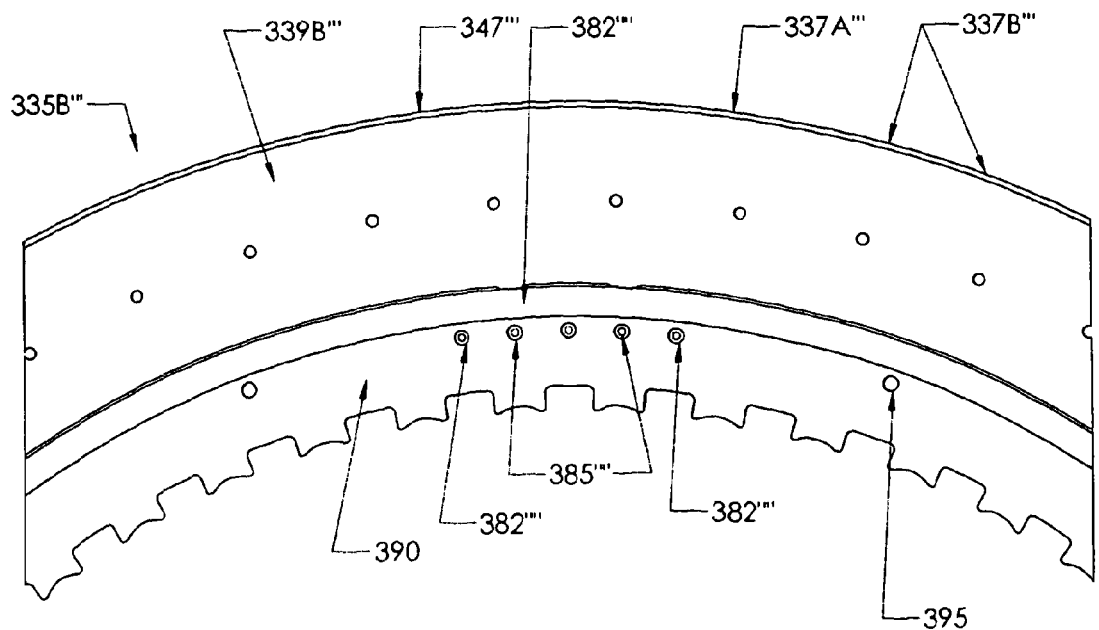

FIG. 16 shows yet another inner stator part 335B'" for use with machine 310 or 310' comprising an electrically insulating body 337A'" defining a pair of opposed annular surfaces 337B'" each supporting an inner conductor region 339B'" comprising a continuous annular conductor sub-region 347'" forming a ground plane and a electrical insulator section 390'. Inner conductor region 339B'" is addressable by connector pins (not shown) extending axially through apertures 385"" located in insulator section 390'. Apertures 3382"" located in insulator section 390' allow connector pins addressing phase groups 345A, 345B, 345C in the machine to pass through inner stator part 335B'". Insulator section 390' further comprises a plurality of circumferentially spaced interconnection pads 395 to allow connection to adjacent stator parts for enabling parallel connection between stator parts.

Figures 17A, 17B:
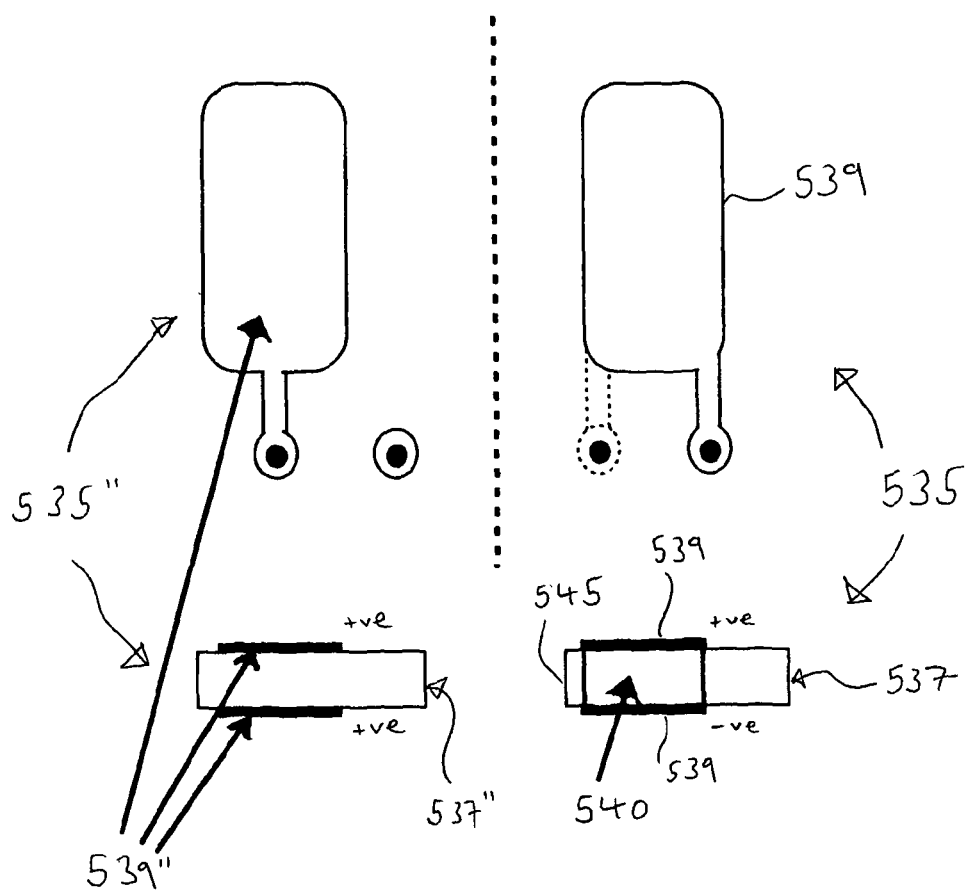
FIGS. 17A-17C show schematic representations of alternative stator configurations.

FIG. 17B shows a section of a stator part 535 for use with machine 310 or 310', stator part 535 comprising an electrically insulating body 537 including a region 540 of high permittivity material and a non-polarisable frame 545. High permittivity region 540 is provided by a block of high permittivity dielectric (e.g. high permittivity ceramic material) housed in a chamber defined by non-polarisable frame 545. As illustrated, high permittivity region 540 substantially extends between opposed conductor regions 539 and may have a cross-sectional area of substantially equal size and shape to the opposed conductor regions 539 in order to maximise the level of capacitance provided by the high permittivity material.

Figure 17C:
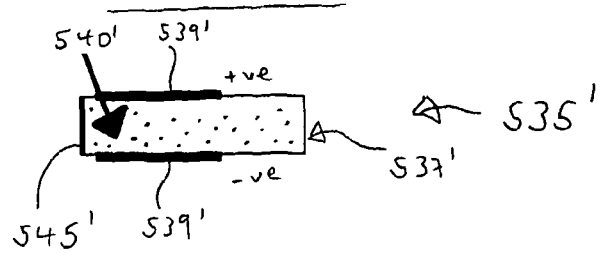

FIG. 17C shows a section of a stator part 535' for use with machine 310 or 310', stator part 535' comprising an electrically insulating body 537 including comprising an electrically insulating body 537' comprising a high permittivity region 540' formed by a plurality of high permittivity dielectric particles (e.g. ceramic particles) interspersed (e.g. homogenously dispersed) through a non-polarisable body 545' (e.g. polymer body). In one embodiment, the dielectric particles comprise a filler powder (e.g. barium titanate or calcium copper titanate) dispersed in a polycarbonate body. The ceramic filler may take the place of glass normally used to provide stiffness to the polymer and so provide a moderate level of capacitance without the need for any multi-part assembly operations (i.e. providing a simple and low cost way of manufacturing the stator part as a single operation injection moulded item).

Advantageously, stator parts 535 and 535' provide local static capacitance immediately adjacent to the active area of the machine in order to prevent the need for cyclic charge to be wholly transferred back to and through associated power electronics at each stage of the rotation cycle. Additionally, it can be shown that force can be increased by maintaining a high average charge in the machine. Force is related to $V^2/2d$ $(k_1-k_2)$ where V is voltage gradient, $k_1$ is the dielectric constant of the high permittivity dielectric, $k_2$ is the dielectric constant of the non-polarisable (or low permittivity) region and d is the distance between the conductor plates 539. Thus, with a high average charge, voltage level can be higher and thus force/torque generation higher.

In contrast to previously described stator parts in which each stator part has the same phase applied to conductor regions on immediately opposite stator parts (as illustrated in FIG. 17A in which stator part 535" comprises a body 537" with no in-build capacitance upon which opposed conductor regions 539" are mounted) in order reduce the level of electrical insulation between the opposed conductive regions, stator parts 535 and 535' require a potential difference across the parts so that the high permittivity regions 540, 540' create the desired capacitance and hence charge is stored. In order to achieve this potential difference across the stator parts 535, 535', axial stator to stator connections so that the conductor region on one side of the stator part is positive and so that the conduction region on the opposite side of the stator part is negative (as illustrated in FIG. 17B).

Figure 18:
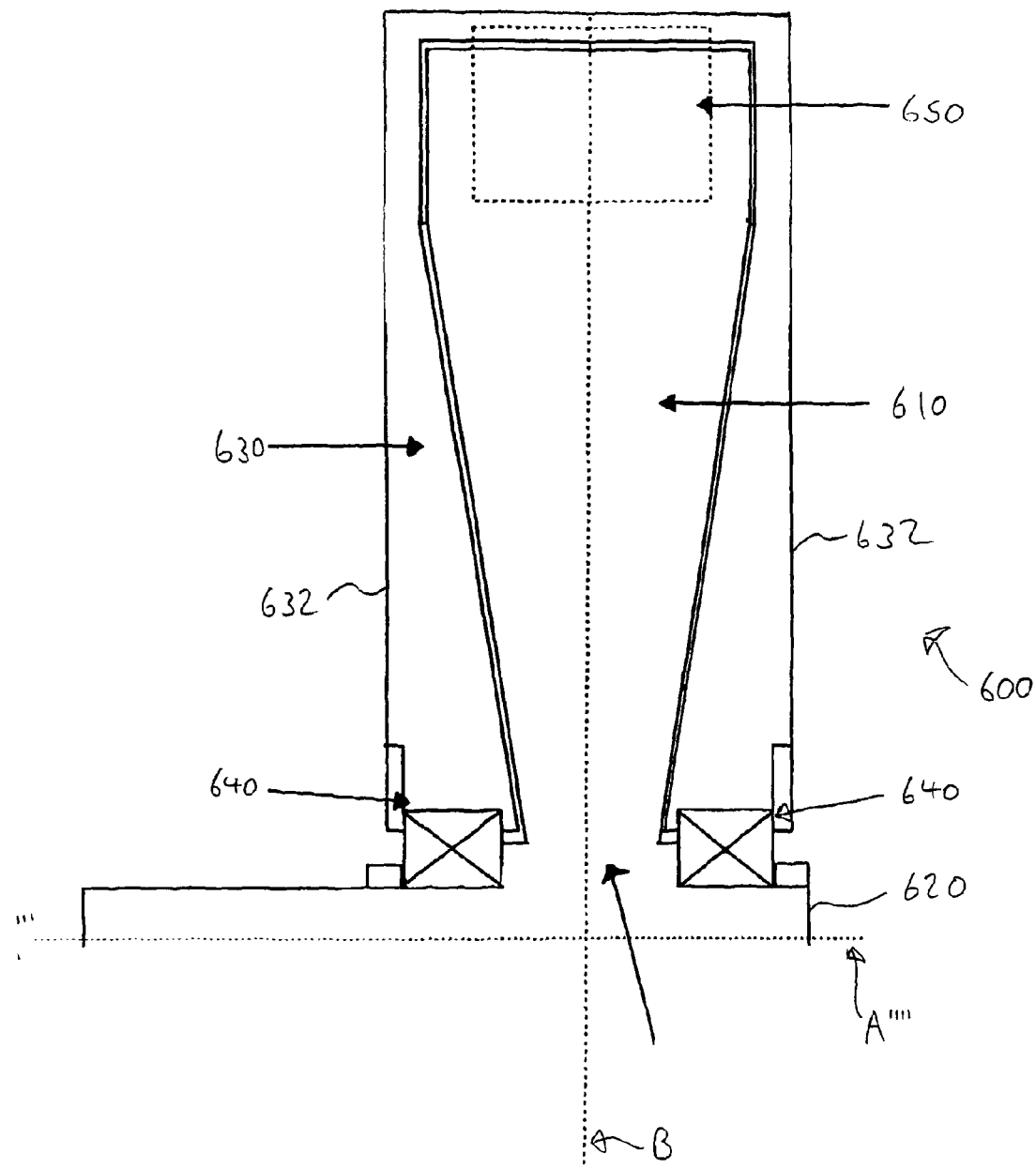
FIG. 18 shows a schematic cross-sectional view of a machine according to yet another embodiment of the present invention.

FIG. 18 shows a machine 600 based on the principles of machine 10 described above for mounting in the hub space of a vehicle wheel. Machine 600 comprises a central stator 610 comprising a tapered body rigidly connected to a fixed shaft 620 defining an axis of rotation "A''''" and a rotor 630 defining a pair of axially spaced tapered elongate arms 632 axially rigidly attached (i.e. to prevent relative movement along the axis of rotation) to outer races of a pair of axially symmetric bearings 640. Stator 610 and rotor 630 together define an active motor region 650 of the type provided in machines 310 and 310' (i.e. with interleaved conductor parts and inner parts which are omitted from the drawing for simplicity). Stator 610 is axially rigidly attached to outer races of bearings 640. By fixing both bearings 640 to both rotor 630 and stator 610, the system becomes rigid about axial centre line B. Thermal growth is then evenly split about the axial centre line, effectively halving the impact on running clearance between the inner and conductor parts within the active motor region 650 compared with an auxiliary-fixed/axially-moveable bearing pairing). Whilst conventionally such an arrangement would put bearings at risk due to the side loads resulting from this rigid assembly under thermal expansion states, in this case the problem is avoided by virtue of the length of the elongate rotor arms. Any expansion at either the outer areas or the inner areas causes a fractional flexure of the rotor arms, thereby limiting the stress imparted to bearings 640.

The invention claimed is:

1. Apparatus for use as a motor or generator, comprising:
a capacitor assembly comprising:
a first conductor part defining a first conductor region and a second conductor part defining a second conductor region, the first and second conductor parts being spaced apart to define opposed sides of a passageway extending between the first and second conductor regions; and
an inner part moveable relative to at least one of the conductor parts along the passageway extending between the first and second conductor regions;
wherein:
(a) the apparatus further comprises a positioning system configured to maintain a predetermined minimum spacing between the inner part and the conductor parts of the capacitor assembly, wherein the positioning system comprises a pressurised fluid system configured to apply a balancing fluid pressure between opposed faces of the inner part and the conductor parts for correcting or preventing any offset displacement of the inner part relative to the conductor parts, the pressurised fluid system comprising a pressurised fluid source and a plurality of pressurised fluid channels in fluid communication with the pressurised fluid source for supplying pressurised fluid to an adjacent inner part, each pressurised fluid channel comprising a passageway or passageways configured to provide a predetermined pressure drop as fluid passes therethrough and an outlet into the passageway; or
(b) the apparatus further comprises a connector for linking together a plurality of sub-regions in a group of a conductor part, wherein the conductor parts are spaced along an axis and the apparatus further comprises a plurality of axially extending connectors for linking different conductor parts, each axially extending connector comprising an elongate connector pin configured to extend through a plurality of conductor parts and transferring forces or torque generated by the apparatus; or
(c) the inner part is separated from at least one adjacent conductor part by a fluid and the apparatus is configured to generate by applying an electric field to the fluid a region of electrical conductivity in the fluid between the first and second conductor regions to generate an effectively frictionless electrical contact between the inner part and the at least one adjacent conductor part; or
(d) at least one of the first and second conductor parts comprises an electrically insulating body for supporting the first and second conductor regions respectively, the electrically insulating body comprising at least one electrically polarisable region and one relatively non-polarisable region; or
(e) any combination of (a)-(d).

2. Apparatus according to claim 1, wherein the inner part is a polarisable or a polarised part.

3. Apparatus according to claim 1, wherein the inner part is configured to follow a path through the passageway and the inner part comprises first and second regions spaced along the path, the first and second regions being configured to provide different levels of attraction to an electric field generated between the first and second conductor parts.

4. Apparatus according to claim 3, wherein the first region of the inner part is electrically conductive and the second region is electrically insulating.

5. Apparatus according to claim 1, wherein the other conductor region comprises a plurality of discrete conductor sub-regions spaced along the path, each substantially registered with a respective one of the plurality of discrete conductor sub-regions of the first or second conductor region.

6. Apparatus according to claim 1, wherein the other conductor region comprises a continuous conductor region extending between each of the plurality of discrete conductor sub-regions in the first or second conductor region.

7. Apparatus according to claim 6, wherein the continuous conductor region forms a ground plane of the capacitor assembly.

8. Apparatus according to claim 1, wherein the apparatus is configured to generate the region of electrical conductivity in the fluid by applying an electric field to the fluid.

9. Apparatus according to claim 8, wherein the electric field generated between the first and second conductor regions is configured to ionise the fluid.

10. Apparatus according to claim 9, wherein the apparatus is further configured to sustain ionisation of the fluid.

11. Apparatus according to claim 1, wherein the fluid pressure system is configured to provide a load-supporting force for maintaining the inner part in a predetermined position relative to the at least one conductor part.

12. Apparatus according to claim 1, wherein the pressurised fluid balancing system is configured to vary the fluid pressure in dependence upon a force/torque demand placed on the apparatus.

13. Apparatus according to claim 1, wherein the pressurised fluid system is configured to provide fluid at a pressure above atmospheric pressure.

14. Apparatus according to claim 1, wherein at least one of the previously defined conductor parts and/or inner parts comprises a coating.

15. Apparatus according to claim 14, wherein the coating has a relative permittivity higher than 5.

16. Apparatus according to claim 14, wherein the coating comprises a ceramic coating or coating of diamond-like carbon.

17. Apparatus according to claim 14, wherein there is substantially zero clearance between the conductor parts and inner parts in the or each capacitor assembly.

18. Apparatus according to claim 17, wherein at least one of the conductor parts and/or inner part comprises a coating having at least one electrically conductive region.

19. Apparatus according to any of the preceding claims, wherein at least one of the inner and conductor parts is segmented.

20. Apparatus according to claim 1, wherein the or each polarisation region of the electrically insulating body comprises a body of polarisable material housed in a chamber or recess defined by the non-polarisable region of the insulating body.

21. Apparatus according to claim 1, wherein the polarisable region of the electrically insulating body is formed by polarisable particles distributed throughout the non-polarisable region of the electrically insulating body.

22. Apparatus according to claim 1, wherein the apparatus is moveable between a first configuration in which clearance between the inner part and at least one conductor part is substantially zero and a second configuration in which clearance between the inner part and the conductor part is non-zero.

23. A motor for mounting in a wheel comprising apparatus as defined in claim 1.

24. A wheel for a vehicle comprising the motor of claim 23.

25. A sensor/detector transducer comprising apparatus as defined in claim 1.

26. Apparatus according to claim 1, wherein the apparatus is configured for use as at least one of a motor, a generator, and a sensor/detector transducer.

27. Apparatus according to claim 1, wherein the pressurised fluid is an ionisable fluid and the voltage across the first and second conductor regions is configured to ionise a localised region of fluid between the first and second conductor regions.

28. Apparatus according to claim 27, wherein the apparatus is further configured to sustain ionisation of the fluid.

29. Apparatus according to claim 1, wherein the fluid has have a relative permittivity greater than 1.

30. Apparatus according to claim 1, wherein the polarity of voltage applied across the polarisable region of the electrically insulating body and the polarity of the voltage applied across the inner part are opposed.

\* \* \* \* \*